April 3, 1962 V. M. YAEGER 3,027,830

RECOGNITION APPARATUS

Filed Jan. 19, 1961 14 Sheets-Sheet 1

INVENTOR.
Vincent M. Yaeger
BY
William W. Holton Jr.
ATTORNEY

INVENTOR.
Vincent M. Yaeger
BY
William W. Holton Jr.
ATTORNEY

INVENTOR.
Vincent M. Yaeger
BY
William W. Holtow Jr.
ATTORNEY

April 3, 1962 V. M. YAEGER 3,027,830

RECOGNITION APPARATUS

Filed Jan. 19, 1961 14 Sheets-Sheet 4

INVENTOR.
Vincent M. Yaeger
BY
William W. Holloway Jr.
ATTORNEY

RECOGNITION APPARATUS

INVENTOR.
Vincent M. Yaeger
BY
William W. Holton Jr.
ATTORNEY

INVENTOR.
Vincent M. Yaeger
BY
William W. Holton Jr.
ATTORNEY

April 3, 1962 V. M. YAEGER 3,027,830

RECOGNITION APPARATUS

Filed Jan. 19, 1961 14 Sheets-Sheet 7

INVENTOR.
Vincent M. Yaeger
BY
ATTORNEY

April 3, 1962 V. M. YAEGER 3,027,830

RECOGNITION APPARATUS

Filed Jan. 19, 1961 14 Sheets-Sheet 8

INVENTOR.
Vincent M. Yaeger
BY
William W. Holton Jr.
ATTORNEY

INVENTOR.
Vincent M. Yaeger
BY
William W. Holton Jr.
ATTORNEY

April 3, 1962 V. M. YAEGER 3,027,830

RECOGNITION APPARATUS

Filed Jan. 19, 1961 14 Sheets-Sheet 10

INVENTOR.
Vincent M. Yaeger
BY
William W. Hallow Jr.
ATTORNEY

INVENTOR.
Vincent M. Yaeger
BY
William W. Holton Jr.
ATTORNEY

INVENTOR.
Vincent M. Yaeger
BY
William W. Holloway Jr.
ATTORNEY

INVENTOR.
Vincent M. Yaeger
BY
William W. Holton Jr.
ATTORNEY

April 3, 1962 V. M. YAEGER 3,027,830

RECOGNITION APPARATUS

Filed Jan. 19, 1961 14 Sheets-Sheet 14

INVENTOR.
Vincent M. Yaeger
BY
William W. Holton Jr.
ATTORNEY

3,027,830
RECOGNITION APPARATUS

Vincent M. Yaeger, Stamford, Conn., assignor to Pitney-Bowes, Inc., Stamford, Conn., a corporation of Delaware Filed Jan. 19, 1961, Ser. No. 83,734
12 Claims. (Cl. 101—2)

This invention relates to a recognition apparatus, and more particularly, to an apparatus for recognizing articles bearing luminescent markings.

The present invention will be described herein as applied to the handling of pieces of letter mail but it will be clear that the invention is not necessarily limited thereto.

Letter mail, when received by a post office for processing, is ordinarily faced and cancelled prior to sorting according to destination. Facing of the letter mail involves arranging the letters in bunches so that all the letters of each bunch face in one direction with all of the stamps located in one corner. For example, with the addresses of all of the letters of the respective bunch in the proper attitude to be read, all of the properly located stamps will be disposed at the upper right-hand corner. Cancelling involves overprinting a stamp or stamps with a cancellation mark. Certain kinds of stamps are ordinarily not cancelled.

Facing and selective cancelling of letter mail is accomplished with an apparatus according to a first embodiment of the present invention. For proper operation of this apparatus, it is requisite that the stamps be "tagged" with a luminescent material. This can be accomplished in several ways such, for example, as by printing an adhesive stamp with ink containing luminescent material, by directly printing a stamp on an envelope with ink containing luminescent material (just as an adhesive stamp is printed or, alternatively, as could be done with a postage metering machine), or by applying to previously printed stamps (whether the latter are adhesive stamps or are printed directly on envelopes) an over-print with ink which contains luminescent material and which is preferably substantially transparent. In order to distinguish between letters bearing stamps to be cancelled and those bearing stamps not to be cancelled, the luminescent material will take the form of a fluorescent substance in one case and a phosphorescent substance in another case.

As is well known, luminescent materials give off light when excited by suitable radiation. Both fluorescent and phosphorescent materials give off light so long as they are so excited. Phosphorescent materials, unlike fluorescent materials, emit light after the excitation ceases. This "after-glow" emission of light by phosphorescent materials decreases in intensity following stoppage of the excitation.

The herein disclosed apparatus according to said first embodiment includes a letter-receiving station having means for supporting a stack of letters on one of their longer edges. The letters are placed on the supporting means as they are picked up in bunches and without regard for the way each letter faces or whether the stamped area is adjacent the upper or lower edge thereof. At the receiving station, feeding and separating means are provided for advancing the letters from the stack in one-by-one succession. From the receiving and separating station, the letters are fed on one of the longer edges and in vertical attitude past sensing mechanism and stamp cancelling mechanism controlled thereby.

The sensing means includes two electronic recognition channels, the first one of which produces a distinctive output when it recognizes a stamp which is luminescently tagged (with either a fluorescent or a phosphorescent material) and the second of which produces a distinctive output only when it recognizes a stamp which is tagged with a phosphorescent material. The cancelling mechanism operates to cancel stamps only in response to a distinctive output from said second recognition channel so that only phosphorescently tagged stamps will be cancelled.

After each letter is fed past the sensing and cancelling mechanism, it is fed into segregating and stacking mechanism. The segregating and stacking mechanism operates to direct letters to a first stacker only in response to a distinctive output from said first recognition channel so that only letters with luminescently tagged stamps will be stacked in the first stacker.

The sensing and cancelling means as noted above is located at one side of the letter feed path and is effective on only those letters of the initial bunch whose stamps face in one of the two possible directions (toward an observer at one end of the bunch and away from the same observer) and whose stamps are adjacent the lower edge. By locating a second sensing and cancelling means at the opposite side of the letter feed path, those letters whose stamps face in the other one of the two possible directions and are adjacent the lower edge will also be selectively cancelled. The segregating and stacking mechanism would also operate in response to a distinctive output by the first recognition channel of the second sensing means in such a way that all of the letters whose luminescently tagged stamps are adjacent the lower edge and face in the other one of said two possible directions will be directed to a second stacker. Those letters, for example, whose stamps are adjacent the upper edge thereof or are not luminescently tagged are directed to a third stacker. It will be apparent that, by inverting all the letters in said third stacker and feeding them through the apparatus a second time, all of the phosphorescently tagged stamps will be cancelled, the first stacker will contain all of the letters with luminescently tagged stamps at their lower edges and facing in one of said two possible directions, the second stacker will contain all of the letters with luminescently tagged stamps at their lower edges and facing in the other one of these two directions, and any remaining letters will be disposed in the third stacker. The letters from the first and second stackers may then be brought together by hand so that all of these letters will face in the same direction. These letters will, therefore, have been faced and selectively cancelled.

According to a second embodiment of the present invention as particularly described herein, the stamp cancelling means is eliminated. Also, the segregating and stacking mechanism is associated with the first and second sensing means in such a way that all phosphorescently tagged stamps will be directed to said first stacker regardless of which one of the two directions its stamp will have faced while being fed through the apparatus, and all fluorescently tagged stamps will be directed to said second stacker. To accomplish this, the segregating mechanism directs each letter to said first stacker when a distinctive output is produced by both the first and second recognition channels (or by only the first recognition channel) of either one of the two sensing means (as will occur only when a phosphorescently tagged stamp is carried by the respective letter). The segregating mechanism directs each letter to said second stacker when a distinctive output is produced by only the second recognition channel of either of the two sensing means (as will occur only when a fluorescently tagged stamp is carried by the respective letter). The apparatus of this second embodiment, then, is operable to sort or segregate, each from the other two, those letters carrying phosphorescently tagged stamps, those carrying fluorescently tagged stamps, and those not carrying a luminescently tagged stamp.

Also, a first modification is provided which is applicable to said first and second embodiments and whereby only the first recognition channel produces a distinctive output in recognition of a phosphorescently tagged stamp and only the second recognition channel produces a distinctive output in the recognition of a fluorescently tagged stamp.

A second modification is also disclosed whereby either one or both of the two recognition channels according to said first embodiment, said second embodiment and said first modification will be effective to distinguish between stamps tagged with a variable number of luminescent bars or other marks.

Accordingly, an object of the present invention is to provide a new and improved apparatus for recognizing articles bearing phosphorescent and/or fluorescent markings.

A further object of this invention is to provide such an apparatus which is effective to recognize and to distinguish between articles bearing phosphorescent markings and articles bearing fluorescent markings. Another object is to provide such an apparatus which utilizes a common scanner for recognizing both fluorescently and phosphorescently marked articles and for distinguishing between the two.

Another object is to provide such an apparatus which utilizes an excitation source that is alternately energized and de-energized a plurality of times while the respective luminescent marking is being scanned.

Further objects and advantages will become apparent as the description proceeds.

Several embodiments of the invention are shown in the accompanying drawings wherein.

Figure 3A:
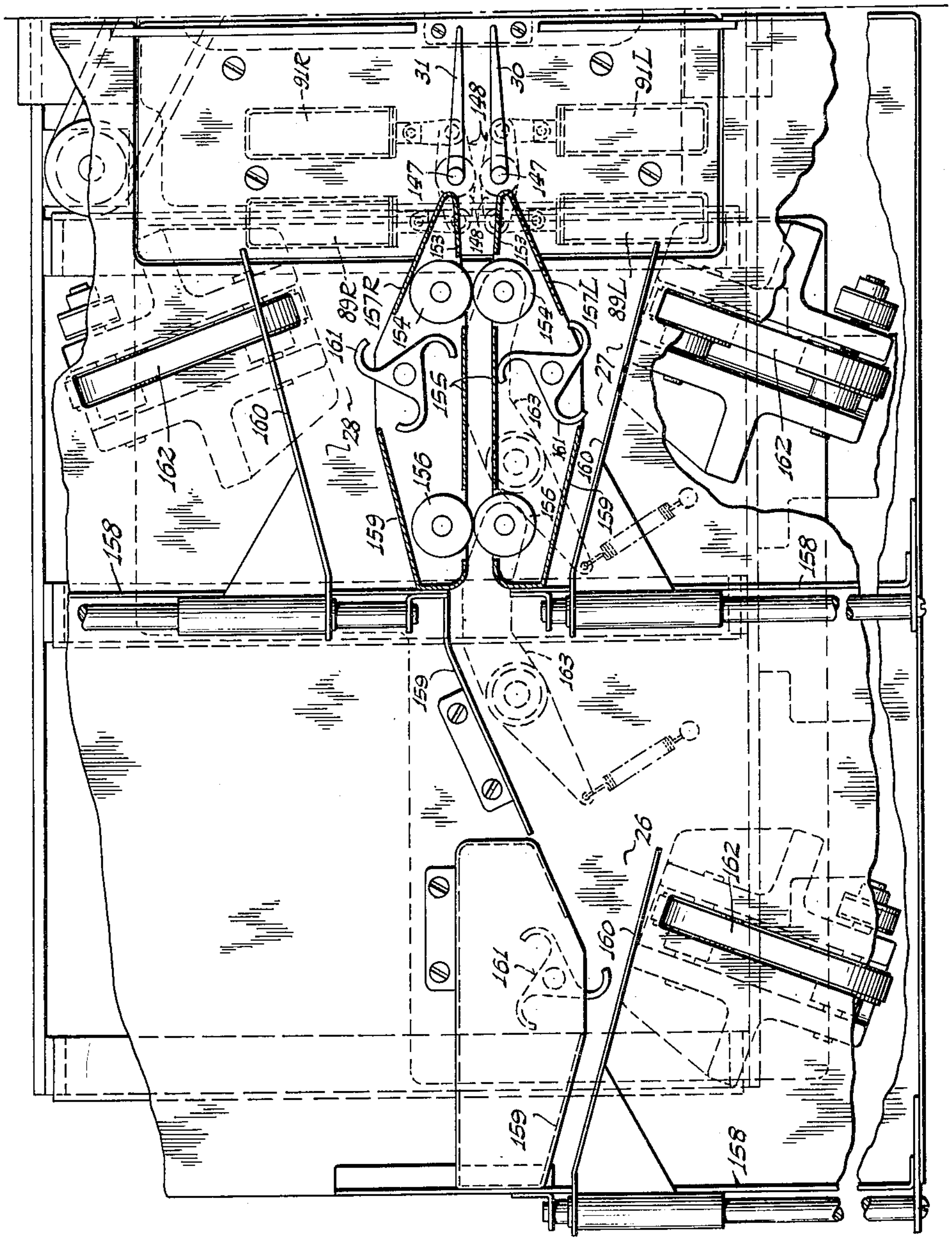
Figure 3B:
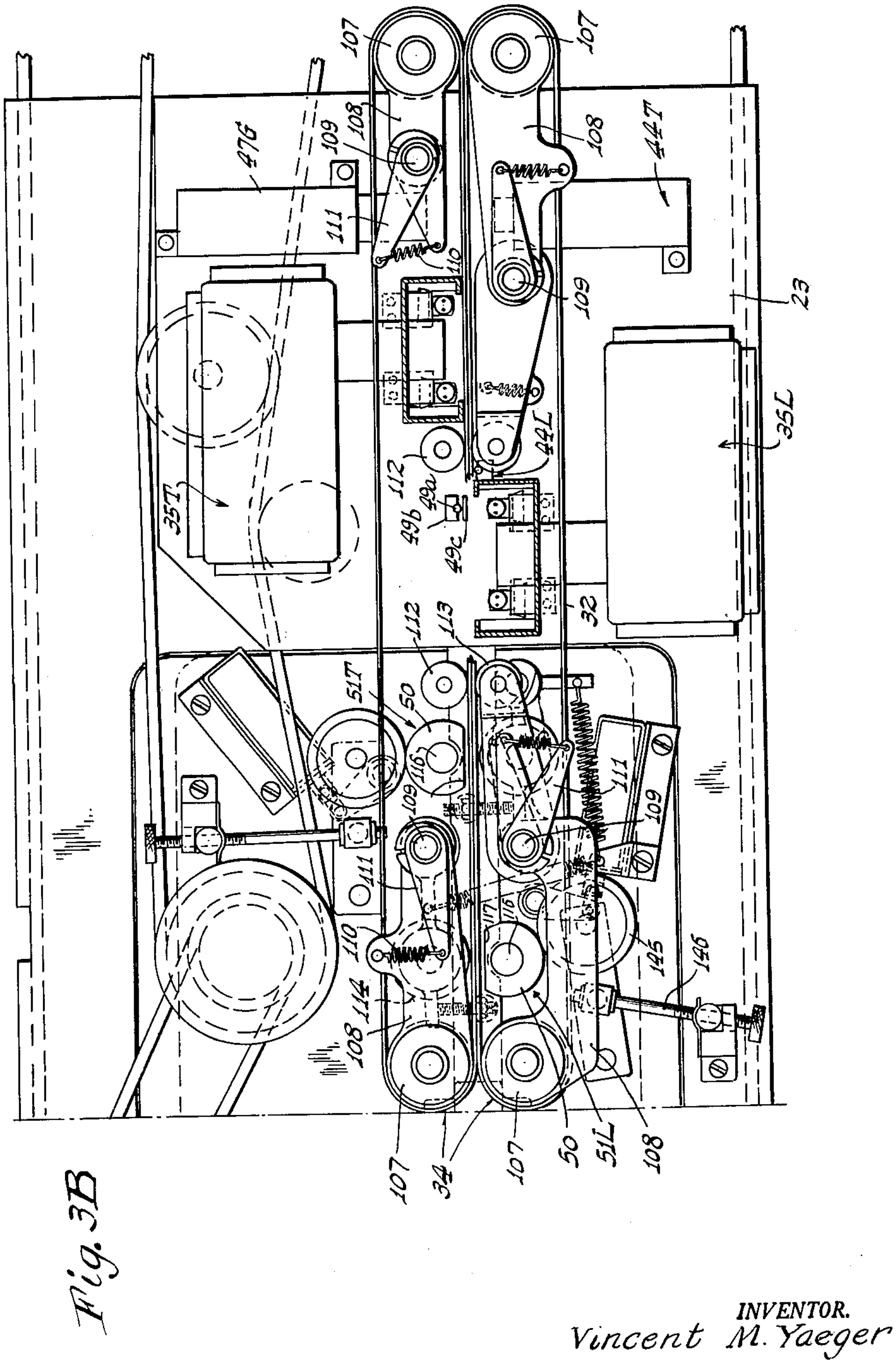
Figure 3C:
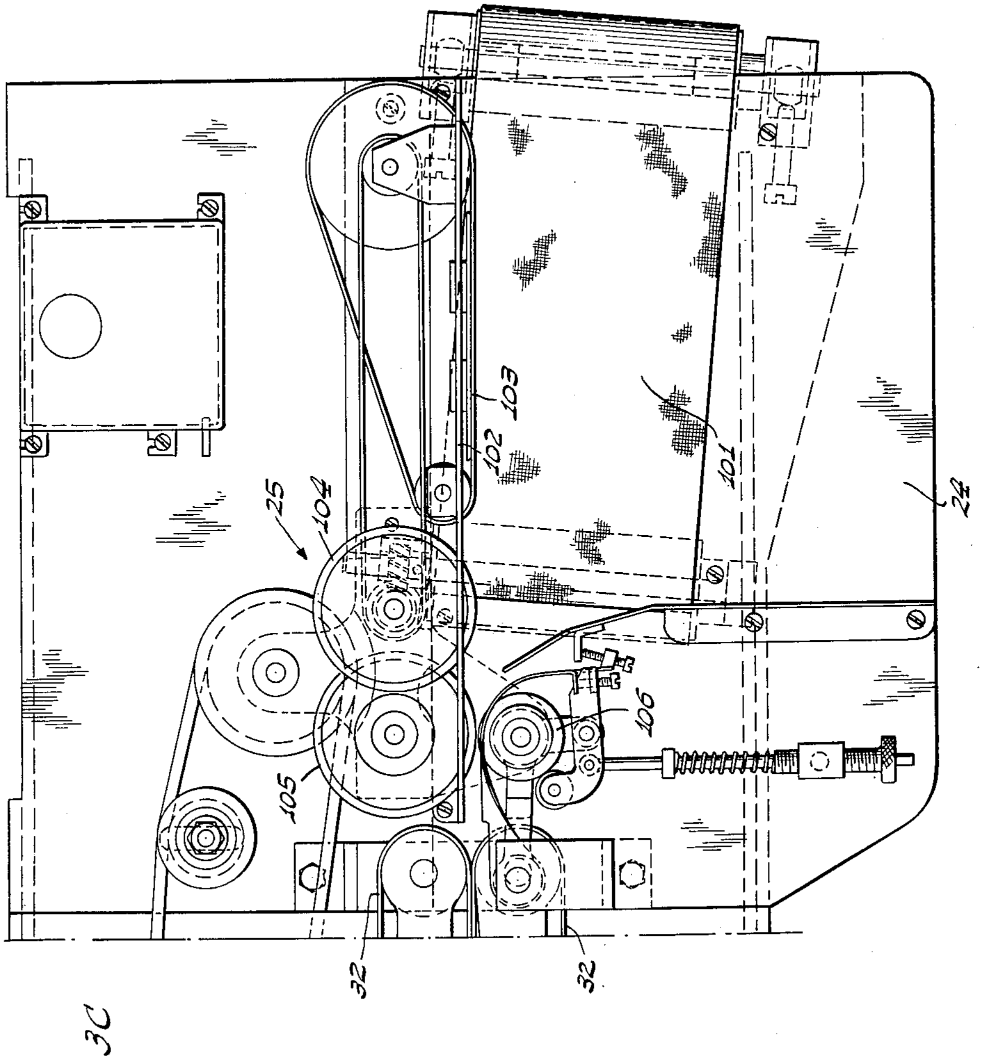
Figure 4A:
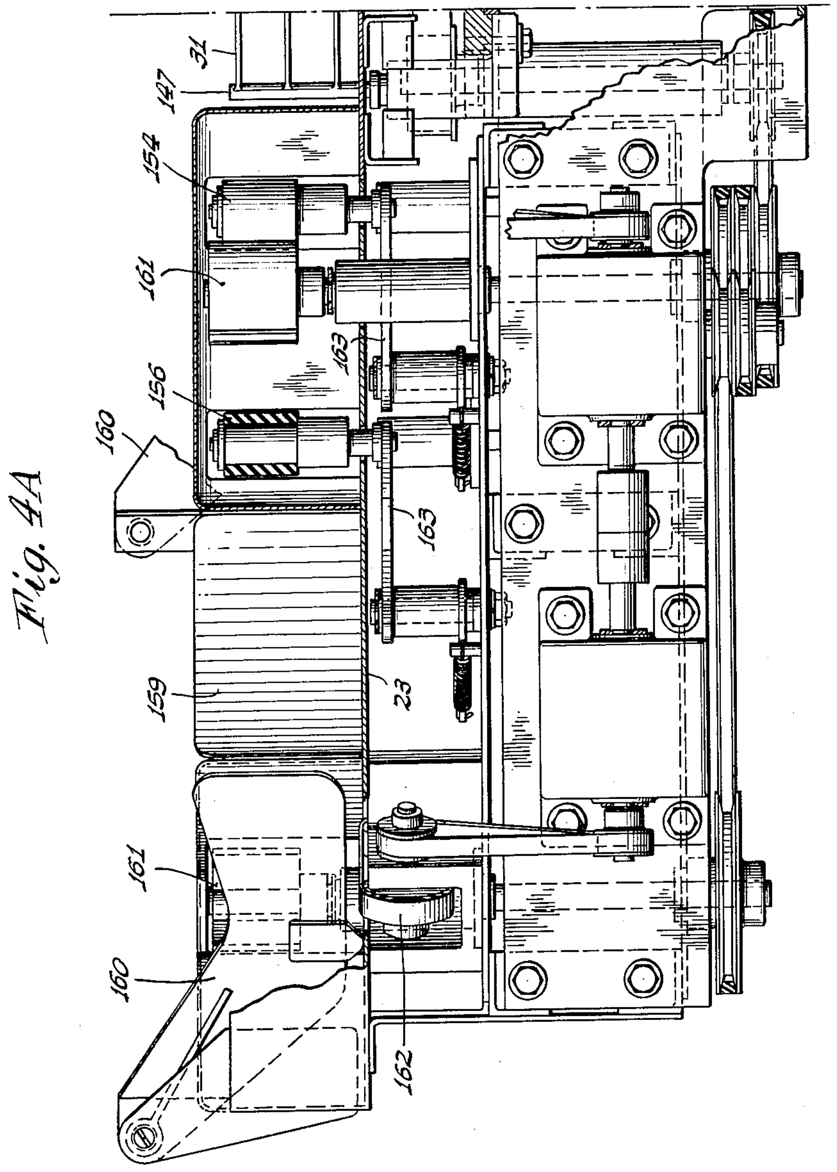
Figure 4B:
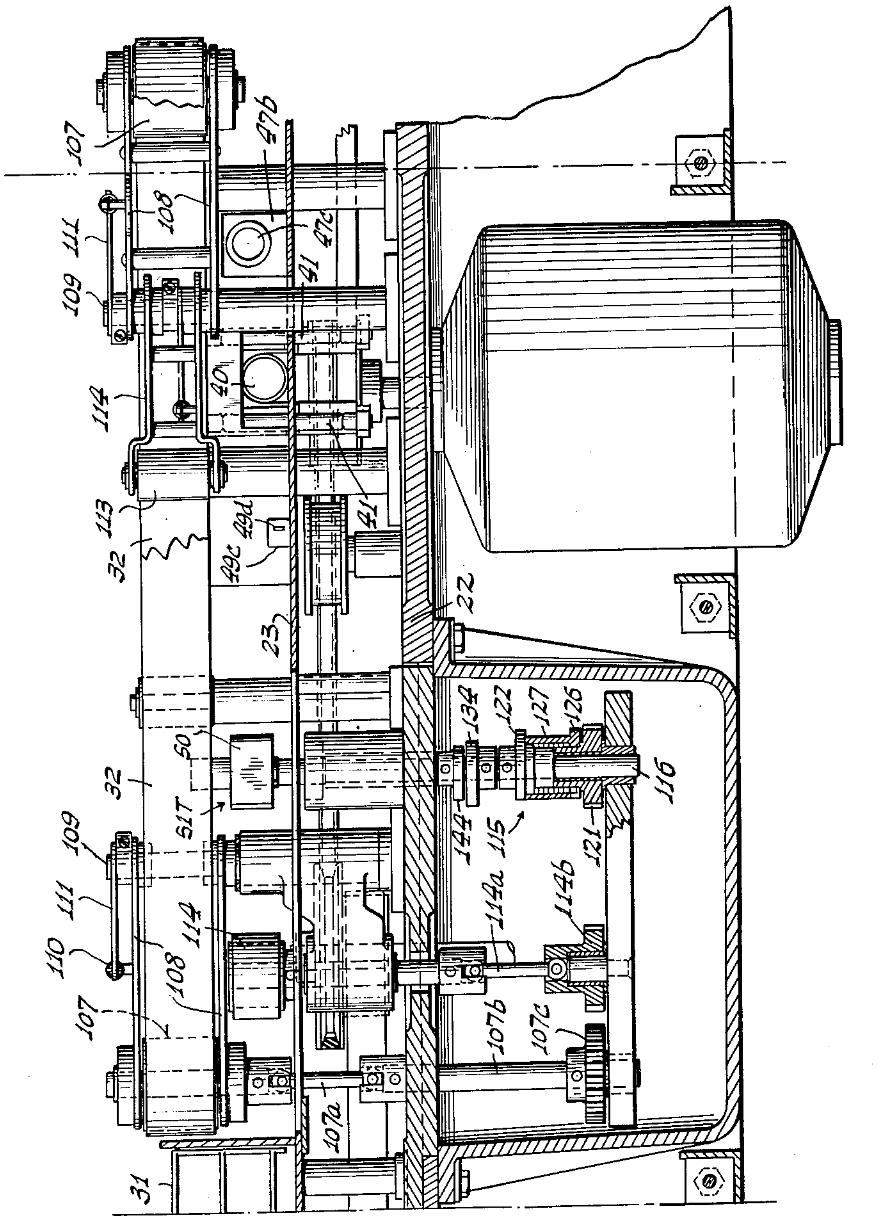
Figure 4C:
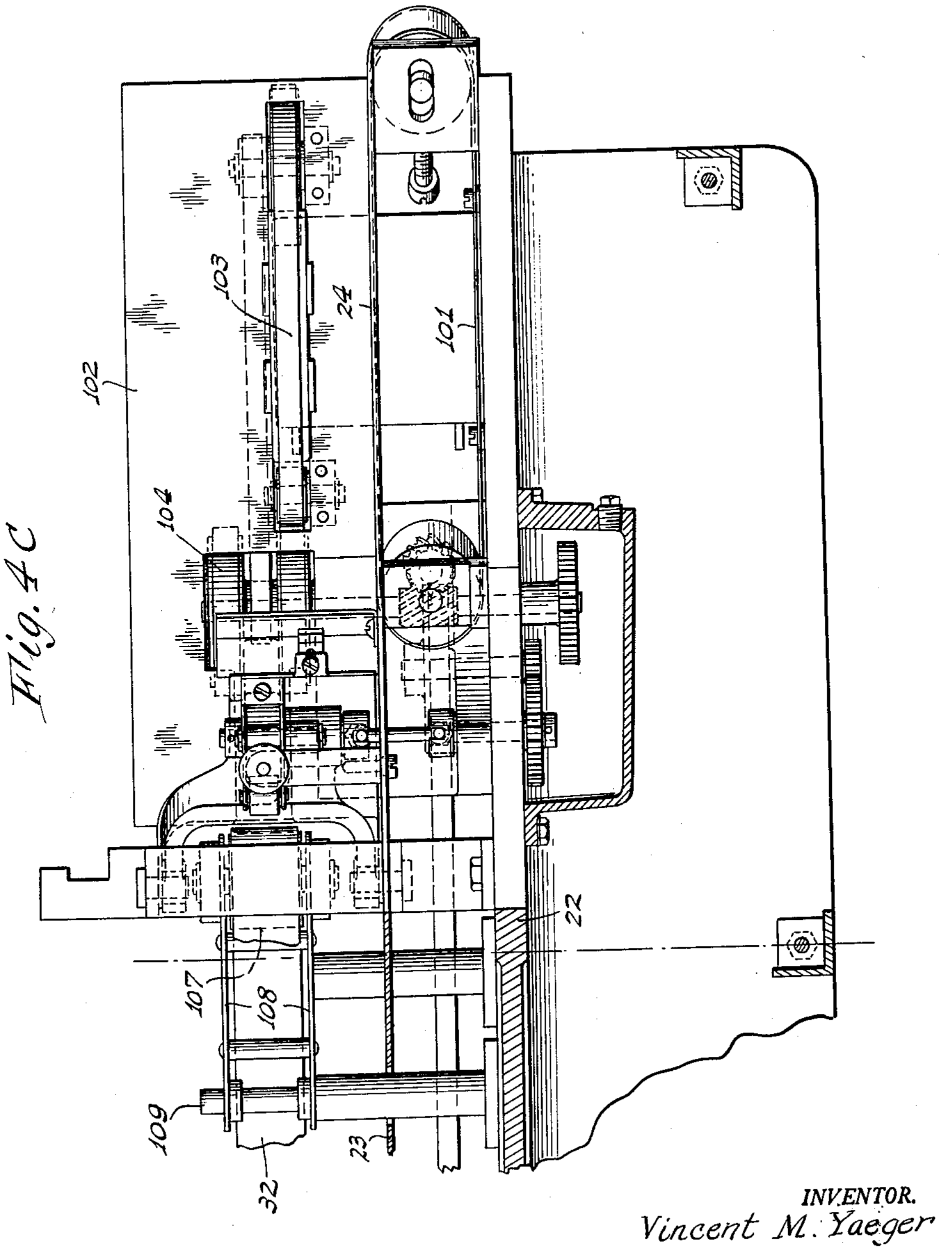
Figure 5:
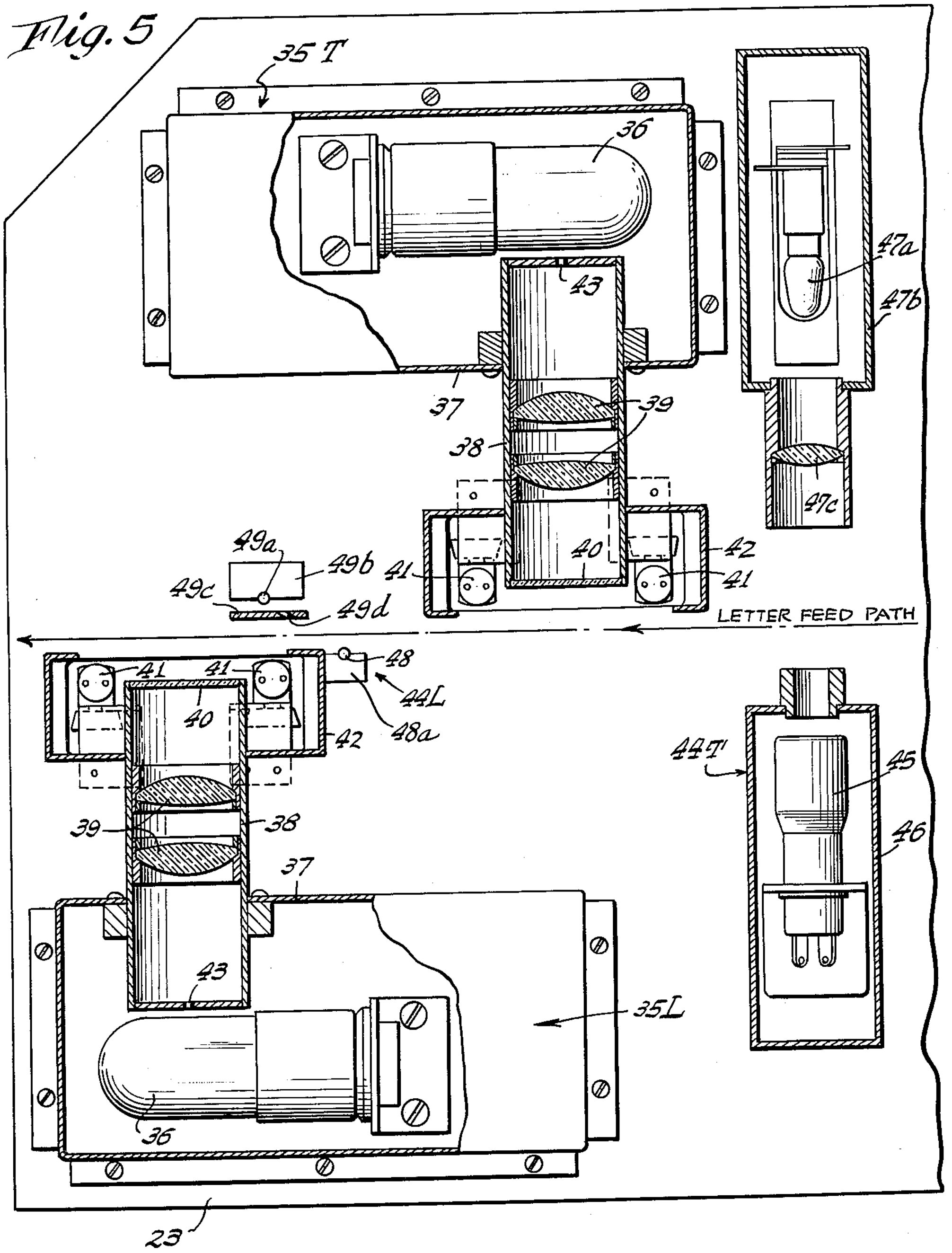
Figure 6:
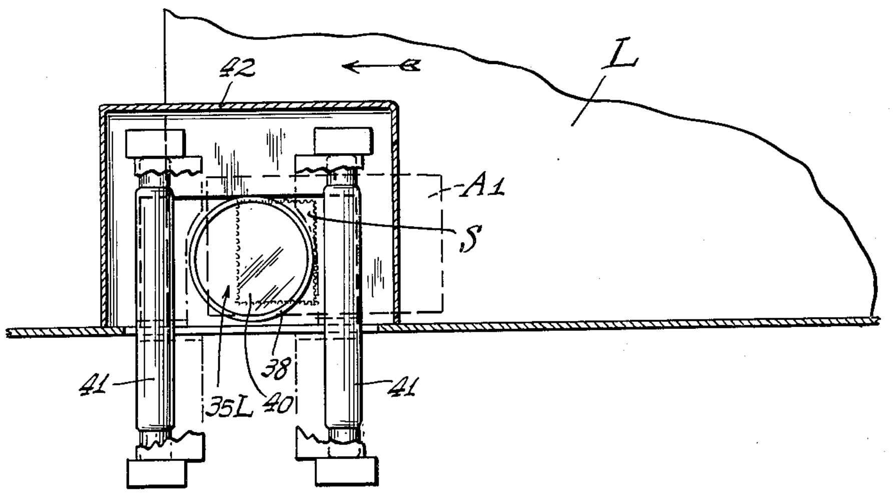
Figure 7:
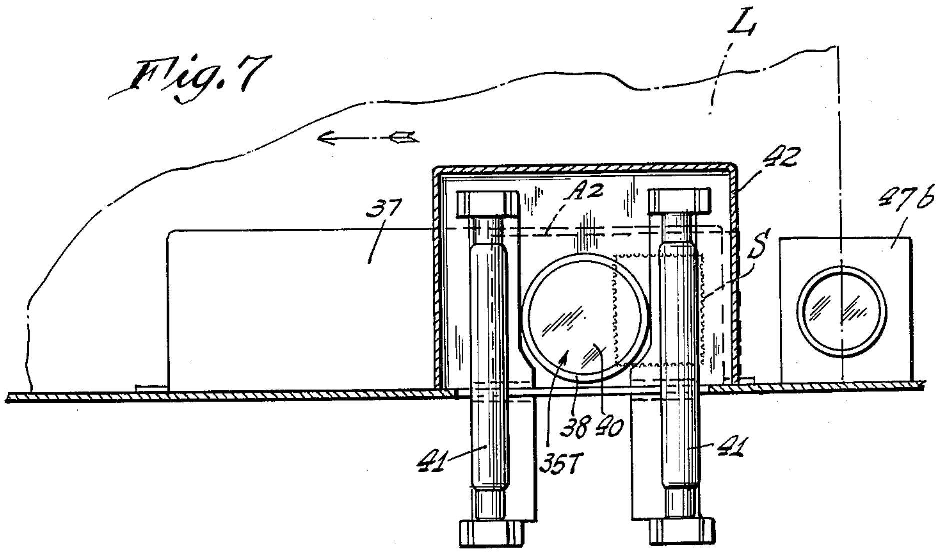
Figure 8:
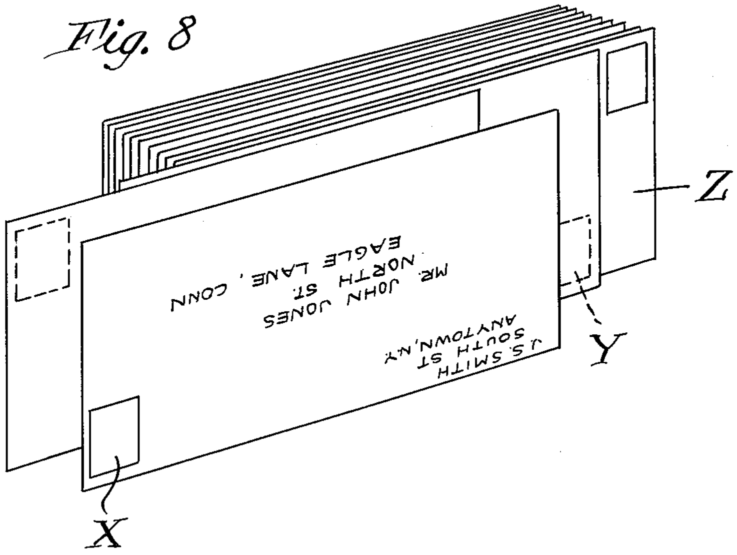
Figure 8A:
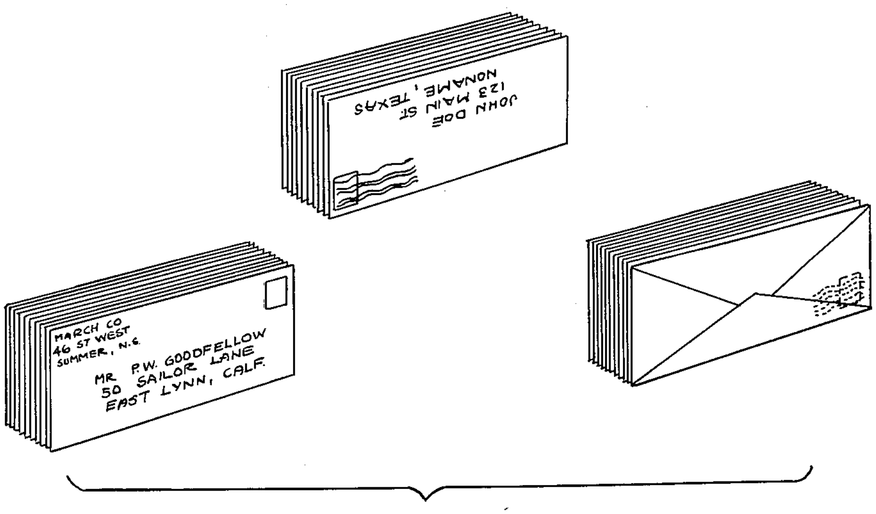
Figure 9:
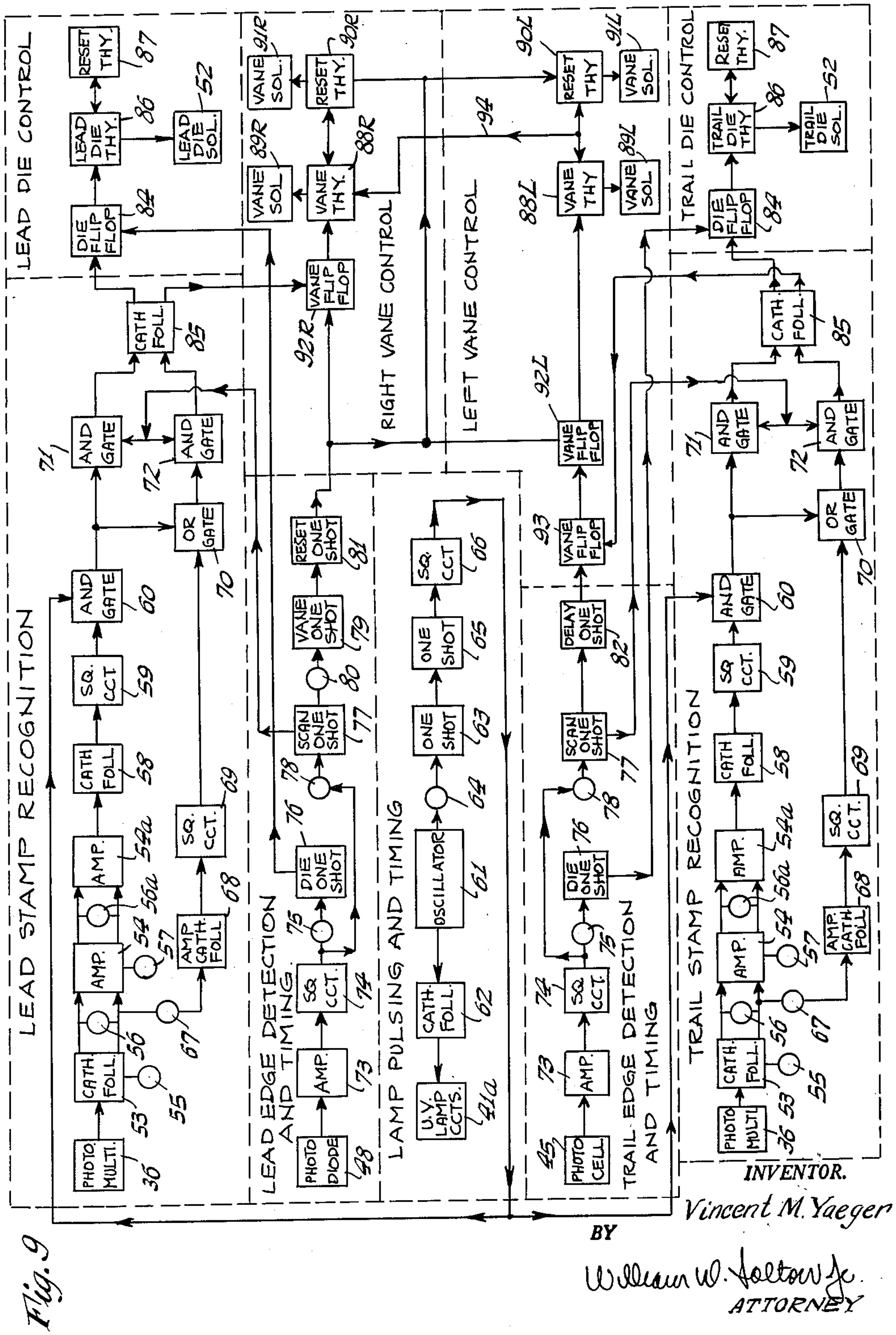
Figure 10:
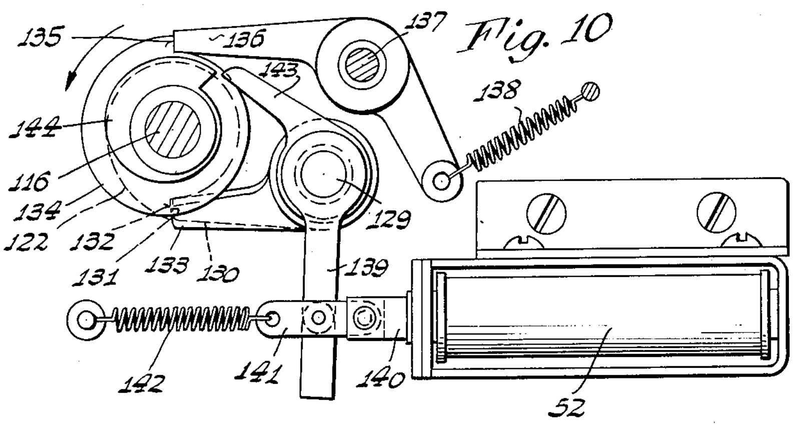
Figure 11:
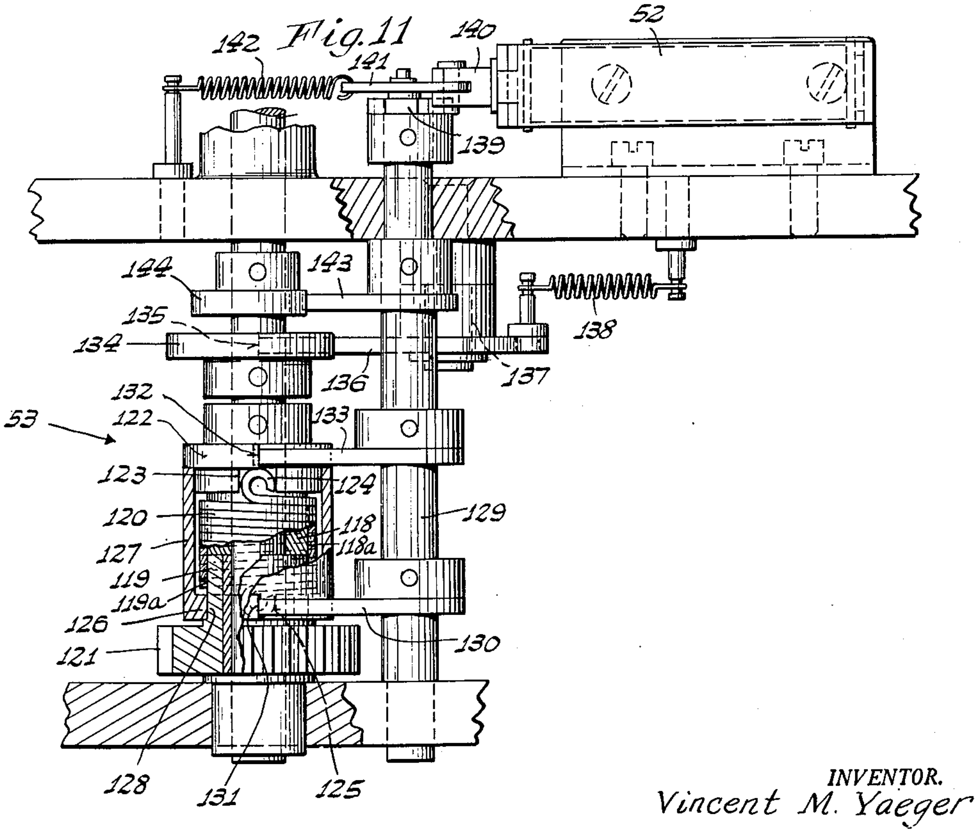
Figure 12:
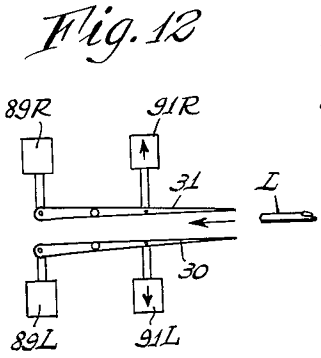
Figure 13:
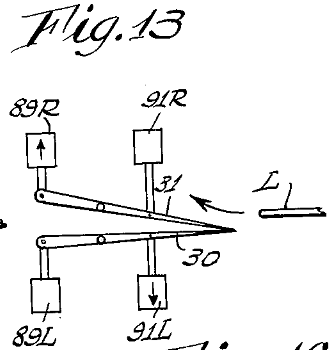
Figure 14:
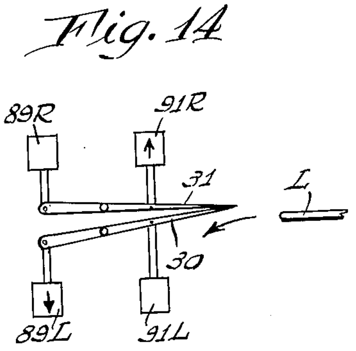
Figure 16:
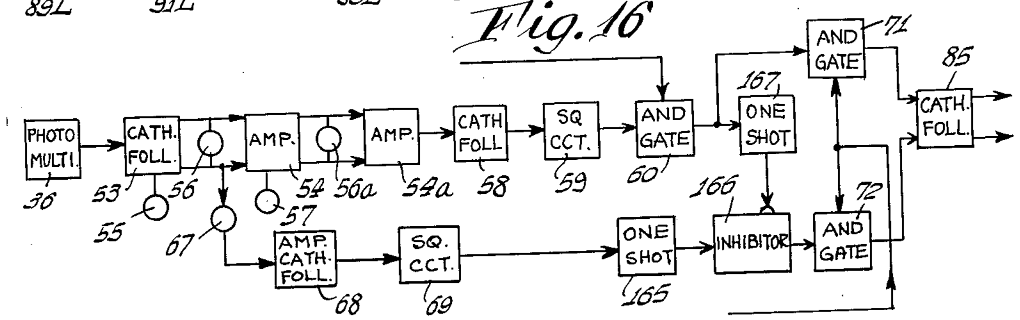
Figure 17A:
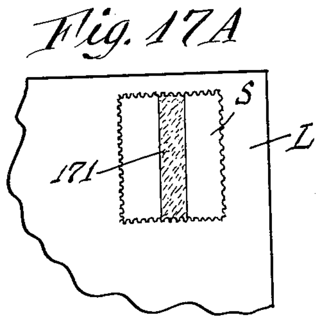
Figure 17B:
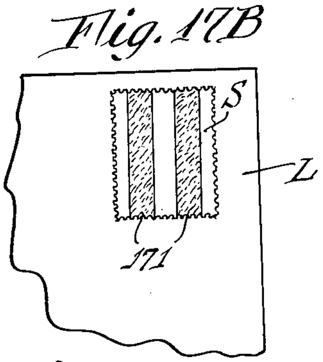
Figure 18:
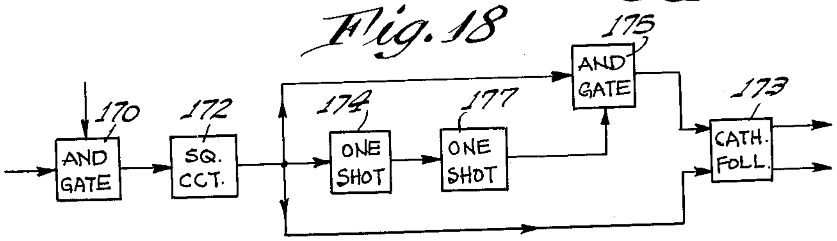
Figure 15:
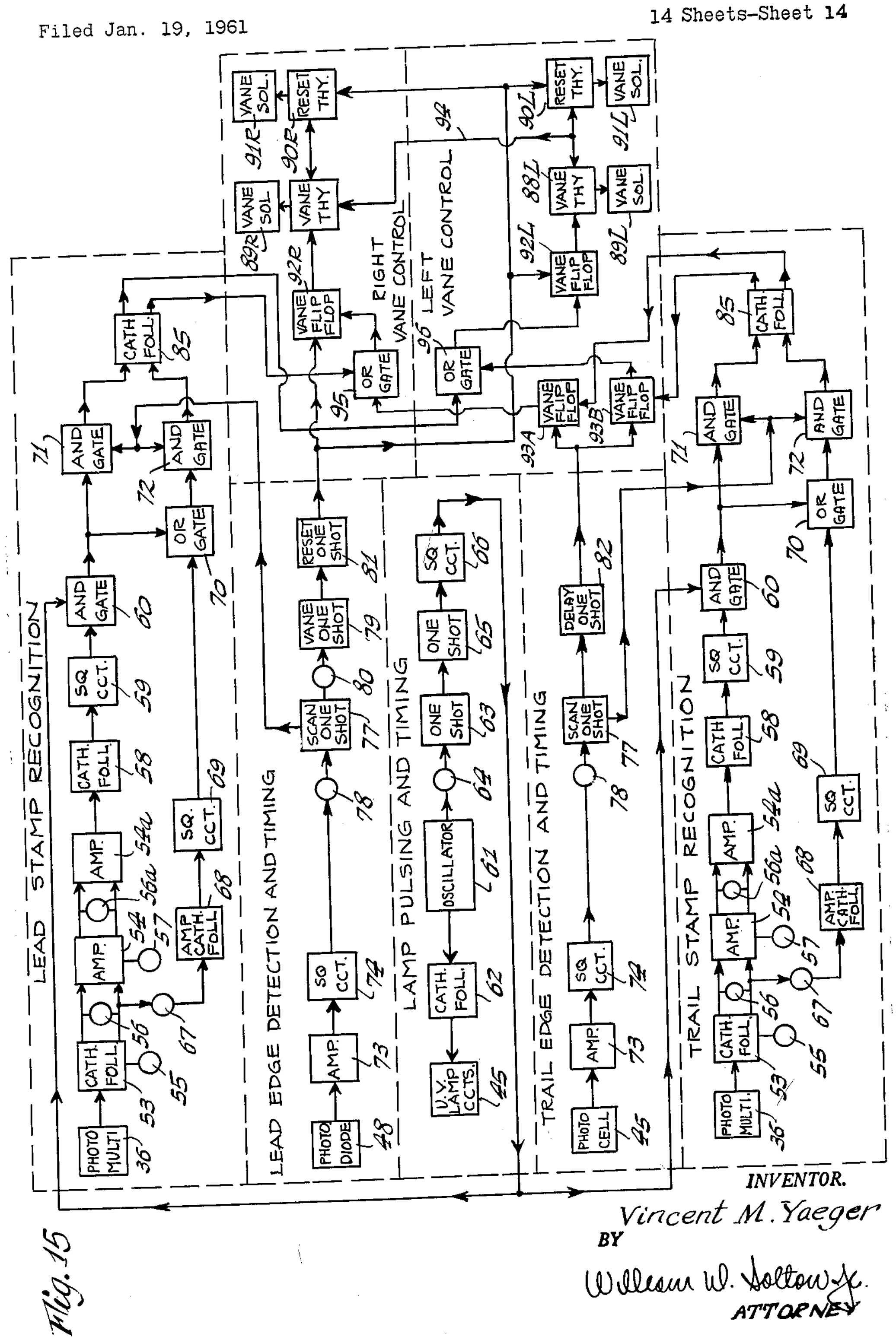

FIG. 3A, FIG. 3B and FIG. 3C are plan views of parts of said apparatus—FIG. 3A showing the segregating and stacking mechanism, FIG. 3B showing the sensing, feeding and cancelling mechanism, and FIG. 3C showing the letter receiving and separating mechanism—FIG. 3A, FIG. 3B and FIG. 3C, when joined successively along the broken lines, showing a complete top plan view of said apparatus with several of the overlying parts broken away to show parts beneath them;

FIG. 4A, FIG. 4B and FIG. 4C are vertical sectional views corresponding to FIG. 3A, FIG. 3B, and FIG. 3C, respectively, and likewise when joined along the broken lines showing the full length of the apparatus;

FIG. 5 is a plan view on a larger scale of edge detection and stamp recognition mechanism of said apparatus;

FIG. 6 is a view on a larger scale showing portions of the leading end stamp sensing mechanism, and a fragment of a letter having a stamp at its lower leading end in position to be sensed;

FIG. 7 is a view similar to FIG. 6, showing portions of the trailing end stamp sensing mechanism, and a fragment of a letter having a stamp at its lower trailing end in position to be sensed;

FIG. 8 is a perspective view of a stack of letters with several of the letters forwardly and longitudinally displaced from the remainder of the stack to show the four attitudes that may be assumed by any one of the letters when ramdomly stacked on one of the longer edges;

FIG. 8A shows three stacks of letters—one having cancelled stamps at the lower leading ends, one having cancelled stamps at the lower trailing ends, and one having stamps uncancelled at their upper sides—the letters having been separated into these three stacks by the operation of said apparatus according to a first embodiment of the invention;

FIG. 9 is an electronic block diagram of a recognition and control system according to said first embodiment;

FIG. 10 is a plan view showing the mechanism for initiating and controlling the operation of the stamp cancelling dies of said apparatus;

FIG. 11 is a side view of the mechanism shown in FIG. 10 and illustrating in detail the one revolution clutch which when released causes the cancelling die driven thereby to make a single revolution and be stopped automatically;

FIG. 12 is a schematic view showing the segregating vanes in the positions they occupy when a letter having no cancelled stamp adjacent its lower edge approaches the vanes;

FIG. 13 is a view similar to FIG. 12 but showing the positions of the segregating vanes when a letter having a cancelled stamp at its lower leading end approaches the vanes;

FIG. 14 is a view similar to FIGS. 12 and 13 but showing the positions of the segregating vanes when a letter having a cancelled stamp at its lower trailing end approaches the vanes;

FIG. 15 is an electronic block diagram of a recognition and control system modified from that of FIG. 9 according to a second embodiment of the invention;

FIG. 16 is an electronic block diagram of a stamp recognition section representing a first modification which can be applied to the lead and/or trail stamp recognition sections of said first and second embodiments;

FIG. 17*a* is a fragmentary view of a letter carrying a stamp tagged with a single bar of luminescent material for recognition by an apparatus according to the further modification depicted in FIG. 18;

FIG. 17*b* is a view similar to FIG. 17*a* but showing a stamp tagged with two bars of luminescent material; and FIG. 18 is an electronic block diagram of a logic section representing a modification which can be applied to the lead and/or trail stamp recognition sections according to said first embodiment, said second embodiment and said first modification.

Figures 1, 2:
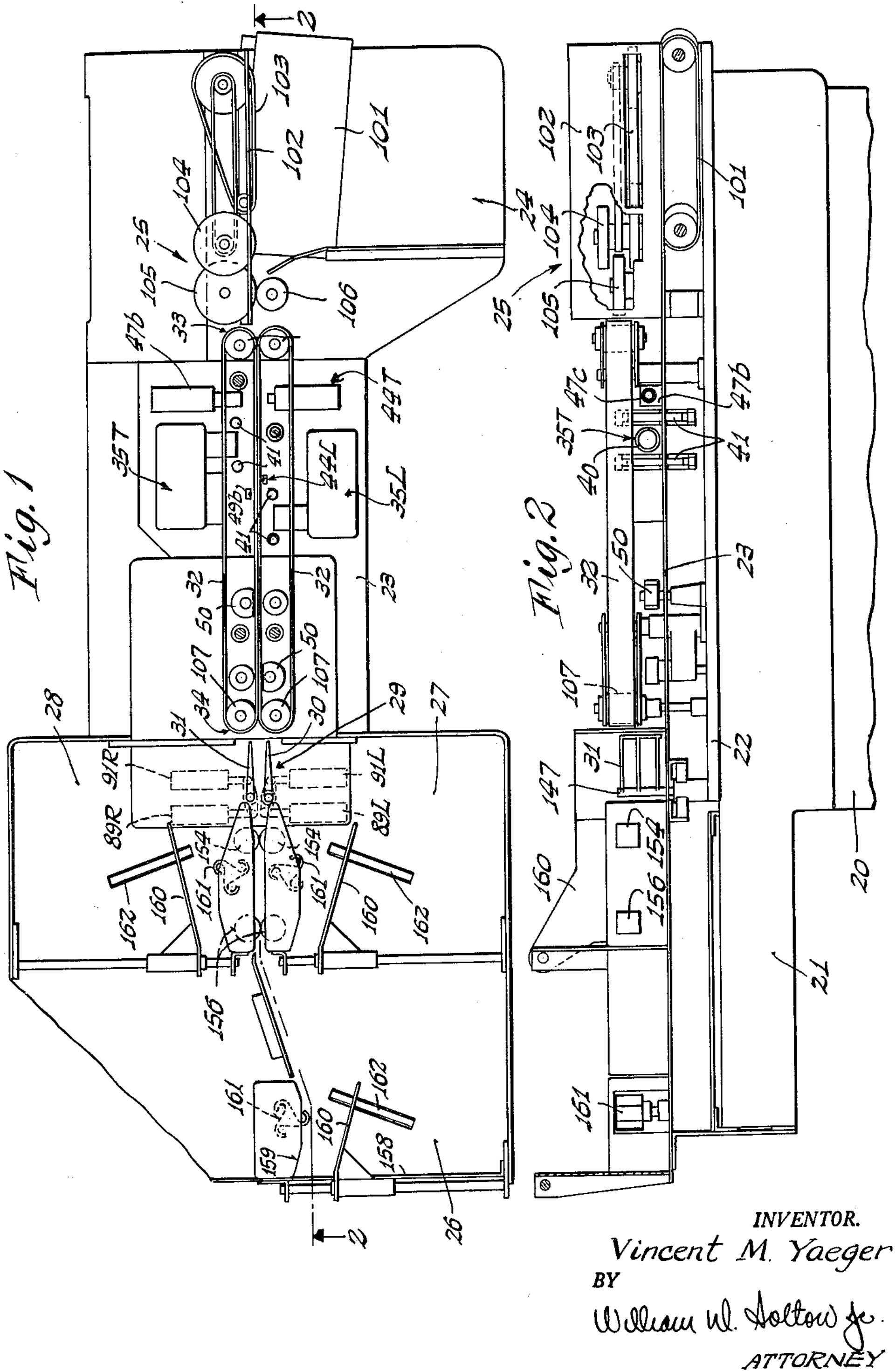
FIG. 1 is a more or less schematic plan view of an apparatus incorporating the present invention.
FIG. 2 is a sectional view taken along line 2—2 of FIG. 1.

Referring to the drawings, particularly FIGS. 1 and 2, and apparatus according to a first embodiment of the present invention is shown as including a base 20 which houses the motor power and the electrical control equipment. The upper portion 21 of the machine has a supporting plate or deck 22 on which there is carried a worktable 23 which may be made in several sections extending in one plane from one end of the apparatus to the other.

At the input end of the apparatus as viewed in FIGS. 1 and 2 there is provided a letter-receiving station 24 at which letters to be operated upon are deposited on the worktable 23 in bunches and on one of their longer edges without regard to the positions the postage stamps occupy on the several letters. At the letter-receiving station there is provided letter-separating and advancing mechanism generally indicated by the reference numeral 25 wherefrom the letters are advanced toward the left one at a time in spaced relation.

At the output end of the machine, as viewed in FIG. 1, there are provided stackers 26, 27 and 28 and segregating mechanism 29 by which letters passing through the machine are caused to enter and be stacked in groups according to whether the luminescently tagged stamps are located at the lower leading end of the letter, the luminescently tagged stamps are located at the lower trailing end of the letter, or the letter has no luminescently tagged stamp adjacent its lower edge at either the leading or trailing end.

The arrangement in the illustrated embodiment of the invention is such that any letters having luminescently tagged stamps at the lower leading position, as indicated at X in FIG. 8, are directed into the stacker 28, letters having luminescently tagged stamps in the lower trailing position, as indicated at Y in FIG. 8, are directed into the stacker 27, and letters having no luminescently tagged stamps on their lower edges, as indicated at Z in FIG. 8, are directed into the stacker 26.

The segregating mechanism 29 and the means for stacking the letters in the stackers 26, 27 and 28 will be described in detail below. Suffice it to say here that the segregating mechanism includes a pair of pivoted vanes 30 and 31 which are positioned so that one or the other of the vanes intersects the path of an advancing letter and deflects it into either the stacker 27 or the stacker 28, or the vanes are parallel to each other as shown in FIG. 1 so as not to intersect the path of the letter. In this latter case the letter will be deposited in the stacker 26. The vanes 30 and 31, as will appear below, are under the joint control of means for sensing the stamp, if the latter is present, and also means for sensing the passage of the leading and trailing edges of the letter.

Between the letter-receiving station 24 and the stackers 26, 27 and 28, the letters are advanced one by one as delivered by the separating and feeding mechanism 25 by a pair of power driven flat feeding belts 32 which are yieldingly held in face-to-face engagement and between which the letters are carried forward in vertical position with their longitudinal lower edges riding on the worktable 23. The feeding belts 32 have their receiving ends 33 located in line with the separating and advancing means 25 and their delivery ends 34 located to direct each fed letter to vanes 30, 31, and it is between the ends of the feeding belts 32 that the sensing means and the stamp cancelling means are located.

Since it cannot be predicted on which side of a letter the stamp will be located, there are two sensing and stamp cancelling mechanisms, one on each side of the path of the letters as determined by the engaging faces of the feeding belts 32. Letters on which the stamps are located at the lower leading ends will have the stamps facing to the left as viewed from the letter receiving end of the machine. On those letters having the stamps at the lower trailing ends, the stamps will be on the right-hand side of the letters. Since the left and right side scanning and cancelling mechanisms are essentially alike, the reference numerals applied to the parts will be distinguished by the suffixes L and T to indicate leading and trailing stamp positions.

As stated above, a stamp sensing means may be provided for each side of the letter. As shown, these are in the form of photoelectric scanning devices 35L and 35T and these are mounted in fixed position so as to be directed adjacent the lower edge portions of advancing letters in the space between the lower edges of the belts 32 and the surface of the worktable 23.

Referring to FIG. 5 which shows the two stamp sensing means in detail, each includes a photomultiplier tube 36 mounted within a lightproof casing 37 supported on the worktable 23. The casing 37 carries a hollow cylinder 38 which supports a pair of lenses 39. A suitable light filter 40 is disposed at the inward end of the hollow cylinder 38. This light filter 40 passes only that visible light which is of comparatively long wave length. In this connection it is noted that letter envelope paper often incorporates fluorescent material as an optical bleach. This fluorescent material emits blue light when excited and is provided to "whiten" the paper. By utilizing the light filter 40 as described above, comparatively shorter wave length visible light including this blue light is filtered out so that the effect of this blue light is negated. The filter and the luminescent materials with which the stamps are tagged must, of course, be compatible with each other. With the filter 40 as described above, the luminescent materials must emit visible light of comparatively longer wave length (for example, upwards of 6000 Angstrom units). By way of example, cadmium sulfide may be used as the phosphorescent material and Rhodamine B may be used as the fluorescent material in the above case.

A wide variety of different luminescent materials can be used (such as disclosed in the two part article "Phosphorescent Inks" by G. T. Schmidling in the May and June 1942 issues of the American Ink Maker magazine and in U.S. Patent No. 2,609,928 to J. F. Doust) depending upon the factors encountered in the particular installation.

The source of excitation for the luminescently tagged stamps comprises a pair of ultraviolet lamps 41 shielded by a casing 42; one of these lamps being located at each side of the hollow cylinder 38 of each one of the stamp sensing devices 35L and 35T. As a stamp moves past the inward end of the respective hollow cylinder 38, the luminescent material incorporated in the stamp is excited by adjacent lamps 41, 41. These lamps are alternately energized and de-energized at a sufficiently rapid rate that each stamp facing in the direction of the inward end of the respective hollow cylinder 38 will be excited a plurality of times at spaced intervals while adjacent the latter. Both phosphorescently tagged stamps and fluorescently tagged stamps will emit light during each interval of excitation by the lamps 41, 41. Only phosphorescently tagged stamps, however, will emit an after-glow light during the spaced intervals of non-excitation between the spaced intervals of excitation. Light emitted by the luminescently tagged stamps as the latter move past the inward end of the respective hollow cylinder 38 they face, whether during the intervals of excitation or the intervals of non-excitation, is filtered by the filter 40, then concentrated by the lenses 39 to pass through a narrow slit 43 provided by the otherwise closed outward end of the respective hollow cylinder 38. The light passing through the slit 43 is directed at the target of the photomultiplier tube 36, and this tube responds in well known fashion by producing an output signal.

By alternately energizing and de-energizing the lamps 41, 41 of each stamp scanner 35L and 35T as described above, several advantages are achieved. For one, this enables the recognition apparatus to distinguish between a phosphorescently tagged stamp and a fluorescently tagged stamp in that only a phosphorescently tagged stamp emits an after-glow during the spaced intervals while the lamps 41, 41 are de-energized. Further, this provides for the use of a single scanner for recognizing and distinguishing between phosphorescent and fluorescent tags. Still another important feature flowing from the alternate periods of excitation and non-excitation is the one that shielding of the photomultiplier tube from the lamps 41, 41 for recognizing phosphorescent tags is greatly simplified because as will later be described, the lamps are de-energized while the recognition occurs as contradistinguished from conventional phosphorescent recognition which occurs at a location forward (along the feed path) of the excitation lamps. Since the intensity of the after-glow light emitted by phosphorescent material decreases after excitation and ordinarily rapidly so, the additional advantage is obtained with the present invention that this afterglow can be detected comparatively earlier after excitation ends (i.e., before the phosphorescent light intensity has had much opportunity to decay).

The present invention provides a device 44L for sensing the leading edge of the letter and a device 44T for sensing the trailing edge of the letter. These sensing devices are located at one side of the feed path of the letters. The sensing device 44T includes a photoelectric cell 45 mounted in a lightproof casing 46 for the reception of light from a lamp 47*a*. The lamp 47*a* is enclosed in a casing 47*b* which supports a lens 47*c* for directing light across the letter feed path and at the photoelectric cell 45. The photoelectric cell 45 is so arranged that a signal is produced thereby each time light from lamp 47*a* to the cell 45 stops being interrupted, as occurs each time the trailing edge of a letter moves past the trail edge sensing device 44T.

The lead edge sensing device 44L utilizes a photo diode 48 which is carried by a support 48*a* adjacent and outside the casing 42 for the ultraviolet lamps 41, 41 of the lead stamp scanner 35L. On the opposite side of the letter feed path is a miniature incandescent lamp 49*a*. Incandescent lamp 49*a* is carried by a support 49*b* and is located behind a shield 49*c* having a narrow slot 49*d*. The slot 49*d* extends through the shield 49*c* along a straight line path connecting the photo diode 48 and lamp 49*a*. The photo diode 48 and miniature lamp 49*a* combination is utilized because of space limitations, it being clear that this combination could be substituted for the photoelectric cell 45 and lamp 47*a* combination of the trail edge sensing device 44T. The photo diode 48 is arranged to produce a signal each time the light from lamp 49*a* to this photo diode is interrupted, as occurs each time the leading edge of a letter moves past the lead edge sensing device 44L.

Between the letter and stamp scanning devices 35L and 35T and the delivery ends of the belts 32 (FIG. 3B), there are provided stamp cancelling mechanisms 51L and 51T, each of which includes a printing die 50. The die 50 of the cancelling mechanism 51L is located at the left side of the letter feed path to cancel stamps on the leading lower end of letters, while the die 50 for the cancelling mechanism 51T is located at the right side of the letter feed path to cancel stamps at the trailing lower end of the letters. The cancelling dies 50, 50 are normally positioned out of the letter path and are operated in response to signals originating in the stamp scanning and edge-detecting devices.

The cancelling mechanism will be more fully described below, but it may be pointed out here that along the feed path of the letters the dies 50 are spaced from their respective stamp sensing devices 35L and 35T and are operated by solenoids 52 (see FIGS. 10 and 11). The solenoids 52 are energized at the proper time to operate the cancelling dies 50, that is to say, at the time a stamp or stamps on a letter are about to pass the operating point of the respective cancelling die 50.

FIGS. 6 and 7 show the relative positions of the stamp sensing devices and letters having stamps at the lower leading and lower trailing ends, respectively. In FIG. 6 the letter L is shown with its stamp S in position for recognition by stamp scanning device 35L. In FIG. 7 letter L is shown with its stamp S in position for recognition by stamp scanning device 35T. The respective areas A1 and A2 (denoted by broken lines) are those which are effectively scanned by the stamp scanners 35L and 35T.

Referring to the electronic block diagram of FIG. 9, it will be seen that the recognition and control means of said first embodiment of the present invention comprises nine main sections, namely: a lead stamp recognition section which includes the photomultiplier tube 36 of the scanner 35L, and a cathode follower stage 53; a leading edge detection and timing section which includes the photo diode 48 of the lead edge sensing device 44L; a lamp pulsing and timing section which includes the ultraviolet lamp circuits 41*a*; a trail edge detection and timing section which includes the photoelectric cell 45 of the trail edge sensing device 44T; a trail stamp recognition section which includes the photomultiplier tube 36 of the scanner 35T, and a cathode follower stage 53; a lead die control section for the cancelling die 50 at the left side of the letter feed path; a right vane control section; a left vane control section; and a trail die control section for the cancelling die 50 at the right side of the letter feed path.

The lead stamp recognition section and the trail stamp recognition section are essentially alike. Each includes, besides the photomultiplier 36 and the balanced cathode follower stage 53, a conventional two stage, balanced, D.C. amplifier which incorporates the two amplifier stages 54, 54*a* and which provides a single-ended output. The cathode follower stage 53 is provided for impedance matching purposes, and a potentiometer 55 is utilized to provide balanced inputs to the two sides of the cathode follower stage 53.

Potentiometer 56 is a conventional sensitivity control, and potentiometers 56*a* and 57 are conventional D.C. level and balance controls. The single-ended output of the second amplifier stage 54*a* is transmitted through a cathode follower 58 to a squaring circuit 59 which shapes the signal for input to an "and" gate 60. Each of the "and" gates 60 provides an output only when it receives two simultaneous inputs. The other input to each of these "and" gates 60 is received from the lamp pulsing and timing section.

The lamp pulsing and timing section includes an oscillator 61. The oscillator 61 alternately energizes and deenergizes the ultraviolet lamps 41 via a cathode follower 62 and the ultraviolet lamp circuits 41*a*. The cathode follower 62 is provided for isolation purposes. The frequency of the oscillator 61 is sufficiently high that the ultraviolet lamps are switched on and off a plurality of times while a lower leading or lower trailing stamp moves past the respective one of scanners 35L and 35T. The trailing end of each "on" pulse of the oscillator 61 triggers a one-shot multivibrator 63. A potentiometer 64 is interposed between the oscillator 61 and the one-shot multivibrator 63 to adjust the duration of the output pulse of the one-shot multivibrator 63. The trailing end of each output pulse of one-shot multivibrator 63 triggers a second one-shot multivibrator 65. The output pulse of the second one-shot multivibrator 65 is shaped by a squaring circuit whose output provides the second input to each of the "and" gates 60. The sum of the durations of the output pulses from one-shot multivibrators 63 and 65 is lightly less than the length of time between successive "on" pulses of the oscillator 61 with the result that each output pulse by one-shot multivibrator 65 terminates before the next succeeding "on" pulse by the oscillator 61 begins. Since the trailing end of each "on" pulse by oscillator 61 triggers the one-shot multivibrator 63, the latter acts as a delay means ensuring that the ultraviolet lamps 41 are extinguished before the second one-shot multivibrator 65 is triggered. Since each of the "and" gates 60 produces an output only when it receives simultaneous inputs from the squaring circuit 66 and the respective one of squaring circuits 59, 59, each of these "and" gates 60 can produce an output only while the ultraviolet lamps 41 are extinguished. Since only a phosphorescently tagged stamp emits light while the lamps 41 are extinguished, each "and" gate 60 produces a pulse only in response to the scanning of such a stamp.

One side of each cathode follower stage 53 of the two stamp recognition sections is tapped for the recognition of fluorescently tagged stamps. Each output pulse from the cathode follower stage 53 is transmitted through a gain-control potentiometer 67 and an amplifier-cathode follower 68. The output of each amplifier-cathode follower 68 is shaped by a squaring circuit 69 whose output provides one of two inputs to an "or" gate 70. The "or" gate 70 produces an output when a pulse is received at either one of its two inputs. The other input to each of the "or" gates 70 is provided by the ouput of the respective one of "and" gates 60. Since both fluorescently tagged stamps and phosphorescently tagged stamps emit light when properly excited, both of such stamps could be effective to cause the respective squaring circuit 69 to produce an output pulse. Potentiometer 67 is adjusted to achieve maximum efficiency in recognizing fluorescently tagged stamps without regard for the resulting efficiency in recognizing phosphorescently tagged stamps. Accordingly, squaring circuit 69 produces an output in response to a fluorescently tagged stamp and may or may not do so in response to a phosphorescently tagged stamp. Each potentiometer 56, however, is adjusted for maximum sensitivity in recognizing phosphorescently tagged stamps. Accordingly, either a phosphorescently tagged stamp or a fluorescently tagged stamp will be effective to cause the respective "or" gate 70 to produce an output pulse, and maximum sensitivity is achieved regardless of which of the two is being recognized. Accordingly, each "and" gate 60 produces an output pulse each time a phosphorescently tagged stamp is recognized, and each "or" gate 70 produces an output pulse each time a fluorescently tagged stamp or a phosphorescently tagged stamp is recognized.

The output of each "and" gate 60 is transmited to an "and" gate 71. The output of each "or" gate 70 is transmitted to an "and" gate 72. For any one of the "and" gates 71 and 72 to produce an output signal, that "and" gate must receive two simultaneous inputs. The other input to each of the "and" gates 71 and 72 is provided by the respective one of the two edge detection and timing sections. As will later be described in detail, the timing and duration of this other input from the respective edge detection and timing section is such that an output from any one of the "and" gates 71 and 72 can only be produced while the respective area A1 or A2 is being scanned. This obviates the possibility of a luminescently tagged stamp being recognized which is improperly located on the letter.

It will be apparent from the above, then, that the lead stamp recognition section provides a recognition channel, beginning with photomultiplier 36 and terminating with "and" gate 60, which produces a distinctive output (the output of the "and" gate 60) each time a phosphorescently tagged stamp at one side of and at the lower edge of a letter is recognized. The lead stamp recognition section further provides a second recognition channel, beginning with photomultiplier 36 and terminating with "or" gate 70, which produces a distinctive output (the output of the "or" gate 70) each time a phosphorescently tagged stamp or a fluorescently tagged stamp at the same side of and also at the lower edge of a letter is recognized. It is further noted that both of these recognition channels utilize a single common scanner 35L. In the same manner, the trail stamp recognition section provides these same two recognition channels except that the distinctive output of the respective one of the two recognition channels is produced when the luminescently tagged stamp is at the opposite side of and adjacent the lower edge of the letter. With the addition of the respective one of "and" gates 71 and 72 to each of the four recognition channels, each of the "and" gates 71 and 72 of the lead stamp recognition channel is limited to producing a distinctive output only in recognition of a luminescently tagged stamp at the lower leading position and each of the "and" gates 71 and 72 of the trail stamp recognition section is limited to producing a distinctive output only in recognition of a luminescently tagged stamp at the lower trailing position.

The lead edge detection and timing section includes the photo diode 48, and the trail edge detection and timing section includes the photocell 45. As previously noted, the photo diode 48 is arranged to produce an output signal when light thereto is interrupted by passage of the leading edge of a letter, and the photocell 45 is arranged to produce an output signal when light thereto stops being interrupted by passage of the trailing edge. In both of these edge detection and timing sections, an amplifier 73 amplifies the output signal of the respective light-sensitive device 45 or 48, and the amplified signal is shaped by a squaring circuit 74. The lead edge of the output pulse of each squaring circuit 74 triggers a one-shot multivibrator 76 for timing the operation of the respective cancelling die 50 for cancelling stamps in the lower lead or lower trail position. The length of the output pulse of the multivibrator 76 is adjusted by the potentiometer 75. The lead edge of the output pulse of the squaring circuit 74 also triggers a one-shot multivibrator 77 whose output operates, as previously described, for timing the stamp scan duration of the respective one of the stamp recognition sections. The potentiometer 78 provides for adjustment of the length of the output pulse of the one-shot multivibrator 77. The trail edge of the output pulse of the one-shot multivibrator 77 of the lead edge detection and timing section triggers another one-shot multivibrator 79. The duration of the output pulse of one-shot multivibrator 79 is adjusted by a potentiometer 80, and the trail edge of this pulse triggers a succeeding one-shot multivibrator 81. The output pulse of one-shot multivibrator 81 is of comparatively short duration and ultimately determines the timing of the operation of the deflecting vanes 30, 31. The trail edge of the output pulse of the one-shot multivibrator 77 of the trail edge detection and timing section triggers another one-shot multivibrator 82, the duration of whose output pulse is fixed.

The lead die control section and trail die control section are essentially alike and each comprises a flip-flop 84 which has two stable states, namely: the set state and the reset state. Each output pulse from the "and" gate 71 of the respective phosphorescent stamp recognition channel, after being transmitted through one side of a dual cathode follower 85, acts to set the flip-flop 84. The trail edge of each pulse from the one-shot multivibrator 76 of the associated edge detection and timing section, acts to reset the respective flip-flop 84. Each flip-flop 84 produces an output each time it goes from the set to the reset state, and this can only occur, of course, if the flip-flop 84 was previously set by a pulse from a phosphorescent stamp recognition channel of the respective stamp recognition section. The delay provided by the output pulse of one-shot multivibrator 76 is timed so that any phosphorescently tagged stamp in the scan area A1 will be cancelled when that stamp reaches the respective cancelling die 50. Since the flip-flop 84 is reset by the trail edge of the output pulse of the respective one-shot multivibrator 76, the delay provided by this output pulse also ensures that the flip-flop setting pulse is produced before said trail edge of the output pulse occurs. The output pulse of flip-flop 84 fires a thyratron 86 which, while ignited, energizes the respective solenoid 52 to operate the cancelling die 50. Each thyratron 86 is coupled with a normally ignited reset thyratron 87 to form a one-shot multivibrator in that the thyratron 86, when it is fired, extinguishes the normally ignited reset thyratron 87. After a suitable delay, the reset thyratron 87 automatically re-fires, thereby extinguishing thyratron 86.

Accordingly, when a letter carrying a phosphorescently tagged stamp adjacent its lower edge is fed past the lead edge or trail edge sensing device 44L or 44T and past the lead stamp or trail stamp scanner 35L or 35T, the first one of as many distinctive outputs as are produced by the phosphorescent stamp recognition channel of the respective stamp recognition section will set the flip-flop 84 of the respective die control section. The trail edge of the pulse from one-shot multivibrator 76 of the lead or trail edge detection and timing section will subsequently reset the respective flip-flop 84 to fire the respective thyratron 86 causing the associated solenoid 52 to operate its cancelling die 50. Of course, the one-shot multivibrator 76 of the lead and trail edge detection and timing sections will act to reset the respective flip-flop 84 every time a letter is fed past the lead and trail edge sensing devices 44L and 44T, but the respective flip-flop 84 will only go from the set to the reset state if it was previously set by the recognition of a phosphorescently tagged stamp.

The right vane control section and the left vane control section are somewhat alike. In this regard, each of these sections includes a first thyratron 88R and 88L, respectively, coupled to a second thyratron 90R and 90L, respectively, to act as a flip-flop. That is, for example, the firing of any one of the four thyratrons 88R, 88L, 90R and 90L will act to extinguish the respective one of these thyratrons coupled thereto.

So long as either one of the thyratrons 88R and 90R of the right vane control section is ignited (i.e., has not been extinguished after being fired), a solenoid 89R or 91R, respectively associated therewith, will be energized. That is, for example, when thyratron 88R is fired, vane solenoid 89R is energized and remains so until the thyratron 88R is extinguished. Each of the thyratrons 88L and 90L is associated with a respective solenoid 89L and 91L in the same manner.

Referring to the schematic views of FIG. 12, it will be seen that the deflecting vanes 30 and 31 lie substantially parallel to each other while vane solenoids 91R and 91L are energized. A fed letter L will therefore be directed to the stacker 26 as shown in FIG. 1. If a fed letter reaches the vanes 30 and 31 while the vane solenoids 89R and 91L are energized (as indicated in FIG. 13), that letter will be directed to the stacker 28. When the vane solenoids 91R and 89L are energized as shown in FIG. 14, the fed letter will be directed to the stacker 27. As will become apparent as the description proceeds, letters with a luminescently tagged stamp (phosphorescently tagged or fluorescently tagged) at the lower lead position will be directed to stacker 28, letters with a luminescently tagged stamp at the lower trail position will be directed to stacker 27, and those letters with no luminescently tagged stamp at either the lower trailing or lower leading position will be directed to the stacker 26.

Referring back to the block diagram of FIG. 9, each of the two vane control sections includes one of two flip-flops 92R and 92L. The vane flip-flop 92R, when it goes from the set to the reset condition, fires vane thyratron 88R. The vane flip-flop 92L, when it goes from the set to the reset condition, fires vane thyratron 88L. Each time the "and" gate 72 of the lead stamp recognition section produces an output pulse (as occurs each time a phosphorescently or fluorescently tagged stamp at the lower leading position is recognized), this pulse is transmitted by the associated dual cathode follower 85 and acts to set flip-flop 92R. Each time the "and" gate 72 of the trail stamp recognition section produces an output pulse (as occurs each time a phosphorescently or fluorescently tagged stamp at the lower trailing position is recognized), this pulse is transmitted by the associated dual cathode follower 85 and acts to set a flip-flop 93. Each output pulse of the one-shot multivibrator 82 of the trail edge detection and timing section acts to reset the flip-flop 93. Each time the flip-flop 93 goes from the set to the reset condition, it produces an output pulse which acts to set the flip-flop 92L. Each time the one-shot multivibrator 81 produces a pulse (as occurs each time the lead edge sensing device 44L senses the passage of the leading edge of a fed letter), the lead edge of this pulse acts to fire the thyratrons 90R and 90L and the trail edge of this pulse acts to reset the vane flip-flops 92R and 92L. Of course, none of the thyratrons 88R, 88L, 90R and 90L can be fired if it is already ignited, and none of the flip-flops 92R, 92L and 93 can go from the set to the reset state so longe as it is already in the reset state.

At the start of operation, each one of the flip-flops 92R, 92L and 93 is in the reset condition. Taking the case when the respective letter has a luminescently tagged stamp (phosphorescently tagged or fluorescently tagged stamp) adjacent its lower leading edge, the "and" gate 72 of the lead stamp recognition section produces a recognition pulse which acts through the associated dual cathode follower 85 to set the vane flip-flop 92R. Subsequently, the leading edge of the output pulse of the one-shot multivibrator 81 acts to fire both of the thyratrons 90R and 90L, and the trailing edge of this output pulse acts to reset both of the flip-flops 92R and 92L. Since only the flip-flop 92R was previously set, only this flip-flop goes from the set to the reset state whereby this flip-flop 92R produces an output pulse which fires the right vane thyratron 88R. The left vane thyratron 90L remains ignited so that the left vane solenoid 91L is energized and the left vane solenoid 89L is de-energized. However, the right vane thyratron 90R is extinguished when the right vane thyratron 88R is fired by the output of the vane flip-flop 92R, whereby the right vane solenoid 89R is energized and the right vane solenoid 91R is de-energized. Accordingly, when the lead edge of the letter carrying the luminescently tagged stamp at its lower lead position reaches the vanes 30, 31, these vanes will be in the position shown in FIG. 13 and the letter will be deflected to the stacker 28.

If, at the start of operation in the above case, vanes 30 and 31 were already in the positions shown in FIG. 13 (in which case thyratrons 88R and 90L were ignited and thyratrons 88L and 90R were extinguished), the left vane thyratron 90L would remain in the ignited state because nothing occurs to extinguish it, and the left vane 30 would consequently remain in the position shown in FIG. 13. The right vane 31 also remains in the same position, however, in spite of the fact that the lead edge of the output pulse of one-shot multivibrator 81 fires right vane thyratron 90R (with the result that right vane thyratron 88R is extinguished, right vane solenoid 91R is energized and right vane solenoid 89R is de-energized) as noted above. This would cause vane 31 to assume the position shown in both of FIGS. 12 and 14, but such does not occur because the output pulse of the one-shot multivibrator 81 is of so short a duration that the trail edge of this output pulse operates to reset vane flip-flop 92R (which was previoously set by a lead stamp recognition signal) to re-fire right vane thyratron 88R (with the result that right vane thyratron 90R is again extinguished, right vane solenoid 89R is re-energized and right vane solenoid 91R is again de-energized) before the right vane can start to move to the position of FIGS. 12 and 14. Consequently, the right vane 31 remains in the position shown in FIG. 13.

It will be clear, then, that each time a fed letter approaches the vanes 30, 31, the one-shot multivibrator 81 produces an output pulse. Immediately after the lead edge of this output pulse occurs, the flip-flop pair of thyratrons 88R, 90R will be in the condition whereby thyratron 88R is extinguished and thyratron 90R is ignited, and the flip-flop pair of thyratrons 88L, 90L will be in the condition whereby thyratron 88L is extinguished and thyratron 90L is ignited; this being so regardless of which of the two flip-flop conditions each of these pairs of thyratrons was in just prior to the occurrence of the lead edge of said output pulse. Immediately after the trail edge of this output pulse occurs, either one of these two pairs of thyratrons may be in the opposite flip-flop condition (whereby the thyratron of that pair with the suffix R is ignited and the thyratron of that pair with the suffix L is extinguished). However, this output pulse is of such a short duration that no movement of the vanes can take place during the time interval between the lead and trail edges of the output pulse. Accordingly, if the flip-flop condition of either one of the pairs of thyratrons is the same before and after this output pulse, no movement of the vane controlled by that pair of thyratrons takes place; and this is true even if the respective pair of thyratrons assumes the opposite flip-flop condition during the short time interval between the lead and trail edges of the output pulse. Movement of either one of the vanes will only occur when the flip-flop condition of the respective thyratron pair after the occurrence of the output pulse is opposite to that before the occurrence of this output pulse. It follows that if either one (or both) of the vanes 30, 31 is to assume the same position for successive letters, no movement of that respective vane (or vanes) occurs from the time the first one of the succeeding letters is directed by the vanes to one of the stackers until after the last one of the succeeding letters has been directed by the vanes to one of the stackers. Stated otherwise, each one of the vanes 30, 31 moves only when the position it is to assume for a given letter is opposite from that which it assumed for the immediately preceding letter.

The timing of the movement of the vanes 30, 31 is effected by the lead edge detection and timing section in that the output pulse of the one-shot multivibrator 81 of this section determines when these vanes assume whatever position they do assume for any given letter. No problem arises in ensuring that recognition of a luminescently tagged stamp at the lower lead position will occur in properly timed relation with detection of the leading edge of the respective letter because a properly located stamp is always within an area A1 (FIG. 6) whose location is fixed relative to the lead edge of the letter. However, it will be clear that since letters are of varying lengths, the distance between the leading edge of a letter and a luminescently tagged stamp at the lower trailing edge of the letter will vary depending upon the length of that particular letter. Ordinarily no difficulty will be encountered because the timing is set to accommodate the longest letters to be acted upon. It may occur, however, that two comparatively short letters to be acted upon, are fed in succession. Of course, the shorter the letter, the earlier, relative to the detection of the leading edge of that letter, will occur the recognition of a luminescently tagged stamp at the lower trailing position on that letter. It is possible, in fact, that when two very short length letters are fed in succession, recognition of a stamp at the lower trailing position on the second letter will occur before the delayed output of the one-shot multivibrator 81 occurs as effected by detection of the leading edge of the first short letter. To avoid this possibility, the vane flip-flop 93 is provided to "store" the luminescent stamp recognition signal from the "and" gate 72 of the trail stamp recognition section for a length of time sufficient to ensure that the output pulse from the one-shot multivibrator 81 for the preceding letter will have occurred prior to the setting of flip-flop 92L. The setting of flip-flop 92L is delayed, once the flip-flop 93 is set, for a length of time determined by the duration of the output pulse of the one-shot multivibrator 82.

Taking the case when the vanes 30, 31 are in the position shown in FIG. 13 and the next respective letter has a luminescently tagged stamp at the lower trailing position, a recognition pulse will be produced by the "and" gate 72 of the trail stamp recognition section. This pulse sets the vane flip-flop 93, and this flip-flop 93, when it goes from the set to the reset state, produces an output pulse to set the flip-flop 92L. The trail edge of the output pulse of the delay one-shot multivibrator 82 acts to reset the flip-flop 93, as noted above, with the result that flip-flop 92L is set. The lead edge of the ensuing pulse from one-shot multivibrator 81 acts to fire thyratrons 90R and 90L, and the trail edge of this pulse acts to reset both of flip-flops 92R and 92L. Since only flip-flop 92L is in the set state, only this flip-flop goes from the set to the reset state with the result that left vane thyratron 88L is fired whereby left vane thyratron 90L is extinguished, solenoid 89L is energized and solenoid 91L is de-energized. Left vane 30 therefore moves from the position of FIG. 13 to that of FIG. 14. The right vane thyratron 90R (which was fired by the lead edge of the output pulse of one-shot multivibrator 81) remains ignited with the result that right vane thyratron 88R remains extinguished, solenoid 89R remains de-energized and solenoid 91R remains energized. Right vane 31 therefore moves from the position of FIG. 13 to that of FIG. 14, and the letter carrying the luminescently tagged stamp at the lower trailing position is deflected to the stacker 27.

When the fed letter has no luminescently tagged stamp at either of the lower leading or lower trailing position, neither one of the "and" gates 72 produces a recognition pulse and all three of the flip-flops 92R, 92L and 93 remain in the reset state. The lead edge of the output pulse of one-shot multivibrator 81 acts to fire thyratrons 90R and 90L, and these thyratrons remain in the ignited state because the trail edge of said output pulse is ineffective to cause either of the flip-flops 92R and 92L to go from the set to the reset state. Consequently, vane thyratrons 88R and 88L remain extinguished, vane solenoids 91R and 91L remain energized, vane solenoids 89R and 89L remain de-energized, the vanes 30, 31 assume the positions as shown in FIG. 12, and the letter is directed to the stacker 26.

To prevent conflicting movement of the vanes 30, 31, vane thyratrons 88L and 88R are inter-connected, as indicated by the line 94, to give precedence to the vane thyratron 88L and a conventional delay circuit is utilized at the input to vane thyratron 88R from flip-flop 92R. That is, if for any reason vane flip-flops 92R and 92L should both be reset at substantially the same time, said conventional delay circuit ensures that thyratron 88L will be fired first, and the interconnection 94 ensures that the firing of thyratron 88L will prevent thyratron 88R from being fired when the delayed signal to the latter arrives. The possibility of vane flip-flops 92R and 92L both being reset at substantially the same time cannot, of course, occur during normal operation with the embodiment of FIG. 9.

From the above description of the block diagram of FIG. 9, it is clear that only phosphorescently tagged stamps at the lower lead or lower trail position are cancelled, only letters with luminescently tagged stamps (phosphorescently and fluorescently tagged stamps) at the lower lead position are directed to the stacker 28, only letters with luminescently tagged stamps at the lower trail position are directed to the stacker 27, and all other letters are directed to the stacker 26. By manually inverting the stack of letters in stacker 26 and then running these inverted letters through the apparatus a second time, those letters which had their stamp or stamps adjacent their upper edges during the first pass will have their stamps adjacent the lower edge during the second pass. All of the letters that went through the apparatus with a luminescently tagged stamp at the lower leading position will be disposed in stacker 28, those that went through the apparatus with a luminescently tagged stamp at the lower trailing position will be disposed in stacker 27, and any letters disposed in stacker 26 will be rejects due, for example, to the absence of a properly located luminescently tagged stamp thereon. In this manner, facing and selective cancelling of the letters is accomplished.

It is to be noted that facing and selective cancelling of letters can be accomplished with only one of the two stamp recognition sections of the arrangement according to FIG. 9. To do so, the trail edge detection and timing section would be eliminated (or rendered inoperative) along with the trail stamp recognition section, the left vane control section and the trail die control section. The left vane 30 would be fixed in any suitable manner to remain in the position shown in each of FIGS. 12 and 13. Only luminescently tagged stamps at the lower lead position would be recognized with the result that only phosphorescently tagged stamps at the lower lead position would be cancelled, only letters carrying a luminescently tagged stamp at the lower lead position would be directed to the stacker 28 (due to vane 31 assuming the position shown in FIG. 13), and all other letters would be directed to the stacker 26 (due to vane 31 assuming the position shown in FIG. 12). In this case, the operator would run a batch of letters through the apparatus, and then repeat three times the operation of running through the apparatus again all those letters that were directed to the stacker 26 during the preceding operation. In carrying out these repeated operations, the operator would invert and/or reverse the stack (from stacker 26) end-for-end. For example, all the letters having a luminescently tagged stamp in the position X as shown in FIG. 8 would be directed to the stacker 28 on the first pass of the letters through the apparatus. By reversing end-for-end the stack of letters directed to the stacker 26, and running this stack through the apparatus, all those letters which were originally in the position Y as shown in FIG. 8 would be directed to the stacker 28. By then inverting the stack of letters directed to the stacker 26 and repeating the first two operations of this example, all of the remaining letters Z having a properly located luminescently tagged stamp will be directed to the stacker 28. The result would be that all the letters of the original batch having a properly located luminescently tagged stamp would be disposed in faced condition in the stacker 28 with all of the properly located phosphorescently tagged stamps cancelled.

With the electronic block diagram according to the second embodiment of the invention as shown in FIG. 15, segregating or sorting of the letters is accomplished in that letters carrying phosphorescently tagged stamps at their lower lead or lower trail position are directed to the stacker 27, letters carrying fluorescently tagged stamps at the lower lead or lower trail position are directed to the stacker 28, and letters not carrying a luminescently tagged stamp at the lower lead or lower trail position are directed to the stacker 26.

Referring to FIG. 15, the lead stamp recognition section, the trail stamp recognition section and the lamp pulsing and timing section are identical to their counterparts in the embodiment of FIG. 9. The lead and trail edge detection and timing sections are also identical to their counterparts in the embodiment of FIG. 9 except that the one-shot multivibrator 76 and the potentiometer 75 of each of these two sections are also eliminated. These eliminations do not, of course, affect the operation of any of the remaining components. The right and left vane control sections of FIG. 15 each include an additional "or" gate 95 and 96, respectively. Also, instead of a single vane flip-flop 93, the left vane control section is provided with two vane flip-flops 93A and 93B.

When a fluorescently tagged stamp at the lower lead position is recognized, the "and" gate 72 of the lead stamp recognition section produces an output pulse which is transmitted by the associated dual cathode follower 85 and the "or" gate 95 to set the flip-flop 92R. When a fluorescently tagged stamp at the lower trail position is recognized, the "and" gate 72 of the trail stamp recognition section produces an output pulse which sets the vane flip-flop 93A. It is noted that the "and" gates 71, 71 produce an output pulse only in recognition of a phosphorescently tagged stamp. When the trail edge of the ensuing pulse from the one-shot multivibrator 82 resets the vane flip-flop 93A, the latter produces an output pulse which is transmitted by the "or" gate 95 to set the flip-flop 92R. It is apparent then that recognition of a fluorescently tagged stamp at either the lower lead or the lower trail position results in setting of the vane flip-flop 92R of the right vane control section. Subsequently, the one-shot multivibrator 81 produces a reset pulse whose lead edge acts to fire thyratrons 90R and 90L and whose trail edge acts to reset both of vane flip-flops 92R and 92L. Since only vane flip-flop 92R was previously set, only this flip-flop goes from the set to the reset state to produce an output pulse which fires vane thyratron 88R and extinguishes vane thyratron 90R. Consequently, the vane solenoids 89R and 91L are energized, the vane solenoids 89L and 91R are de-energized, the vanes 30, 31 assume the position shown in FIG. 13, and the letter is directed to the stacker 28.

When a phosphorescently tagged stamp at the lower lead position is recognized, both of the "and" gates 71 and 72 of the lead stamp recognition section produce an output pulse. The output pulse of this "and" gate 72 effects the setting of the vane flip-flop 92R, as previously described. The output pulse of the "and" gate 71 of the lead stamp recognition section is transmitted by the associated dual cathode follower 85 and the "or" gate 96 to set the vane flip-flop 92L. It is clear, then, that recognition of a phosphorescently tagged stamp at the lower lead position results in the setting of both of the vane flip-flops 92R and 92L. As will now be described, both of the vane flip-flops 92R and 92L will also be set by the recognition of a phosphorescently tagged stamp at the lower trail position. In this regard, both of the "and" gates 71 and 72 of the trail stamp recognition section produce an output pulse in recognition of a phosphorescently tagged stamp at the lower trail position. The output pulse of this "and" gate 71 is transmitted by the associated dual cathode follower 85 and sets the vane flip-flop 93B. The trail end of the output pulse of the one-shot multivibrator 82 resets the flip-flop 93B which responds by producing an output pulse that is transmitted through the "or" gate 96 to set the vane flip-flop 92L. The output pulse of the "and" gate 72 of the trail stamp recognition section is transmitted through the associated dual cathode follower 85 to set the vane flip-flop 93A whose output, effected by the trail end of the output pulse of one-shot multivibrator 82, is transmitted through "or" gate 95 to set the vane flip-flop 92R.

With both of the flip-flops 92R and 92L being set, thyratrons 90R and 90L will be fired when the lead edge of the pulse from one-shot multivibrator 81 occurs, and both of the vane flip-flops 92R and 92L will be reset when the trail edge of this pulse occurs. The resulting output pulse of the vane flip-flop 92L acts to fire vane thyratron 88L, and does fire this thyratron and extinguish thyratron 90L. The resulting output pulse of the vane flip-flop 92R acts to fire the thyratron 88R, but, as described above in connection with the embodiment of FIG. 9, the thyratron 88L has precedence over the thyratron 88R. That is, when both of the vane flip-flops 92R and 92L are reset at substantially the same time, thyratron 88L will be fired but thyratron 88R will not be fired. Consequently thyratron 88R remains extinguished, thyratron 90R remains ignited, vane solenoids 89L and 91R are energized, vane solenoids 89R and 91L are de-energized, the vanes 30, 31 assume the positions shown in FIG. 14, and the letter carrying the phosphorescently tagged stamp is directed to the stacker 27.

When the respective letter being fed carries no luminescently tagged stamp at either the lower leading or lower trailing position, none of the "and" gates 71 and 72 produces an output and neither of the vane flip-flops 92R and 92L is set. The lead edge of the ensuing pulse from one-shot multivibrator 81 acts to fire thyratrons 90R and 90L, and the trail edge of this pulse fails to reset either of the vane flip-flops 92R and 92L because neither of these flip-flops was previously set. Consequently, vane solenoids 91R and 91L remain energized, vane solenoids 89R and 89L remain de-energized, vanes 30 and 31 assume the positions as shown in FIG. 12, and the letter is directed to the stacker 26.

The embodiment of FIG. 15 has been shown and described in a manner suited to a ready understanding of this embodiment. As will now be pointed out, however, this embodiment is susceptible of a structural simplification which has no effect on the overall operation thereof. In this regard and as noted above, one of the "and" gates 71 produces an output pulse when a properly located phosphorescently tagged stamp is fed through the apparatus, and this ultimately causes vane thyratron 88L to become ignited. A respective one of the "and" gates 72 also produces an output pulse when a properly located phosphorescently tagged stamp is fed, but this is ineffective to cause vane thyratron 88R ultimately to become ignited (because vane thyratron 88L has precedence over vane thyratron 88R). Of course, if one of the "and" gates 71 produced an output pulse and the respective one of the "and" gates 72 failed to produce a pulse, the result would be the same, namely vane thyratron 88L would ultimately be ignited and vane thyratron 88R would ultimately be extinguished. Accordingly, it is clear that vane thyratron 88L is ultimately ignited and vane thyratron 88R is ultimately extinguished when a phosphorescently tagged stamp is fed; and this is the case regardless of whether one of the "and" gates 72 does or does not produce an output. It follows that both of the "or" gates 70 can be eliminated along with the connection thereto from the respective one of the "and" gates 60 whereby the output of the respective squaring circuit 69 is transmitted directly to the respective one of the "and" gates 72. With the arrangement of FIG. 15 so modified, the respective one of the "and" gates 72 may or may not produce an output when a properly located phosphorescently tagged stamp is fed, but, as noted above, this is immaterial to the overall operation of the apparatus; the end result being that vane thyratron 88L will ultimately be ignited and vane thyratron 88R will ultimately be extinguished. Of course, when a properly located fluorescently tagged stamp is fed through the apparatus just the reverse will be the case in that vane thyratron 88R will ultimately be ignited and vane thyratron 88L will ultimately be extinguished.

By manually inverting the stack of letters disposed in the stacker 26 after the first pass of a batch of letters through the apparatus and running these inverted letters through the apparatus a second time, all of the letters of the original batch carrying a properly located fluorescently tagged stamp will ultimately be disposed in the stacker 28, all of the letters carrying a properly located phosphorescently tagged stamp will ultimately be disposed in the stacker 27, and all of the letters not carrying a properly located luminescently tagged stamp will ultimately be disposed in the stacker 26.

It is to be noted that when any one of the "and" gates 71, 71, 72, 72 of both FIGS. 9 and 15 produces an output pulse in recognition of a luminescently tagged stamp, that "and" gate may, and likely will, produce more than one output pulse in recognition of the same stamp. This is the case, of course, because the ultraviolet lamps 41 are energized during a plurality of spaced intervals while the respective luminescently tagged stamp (or stamps) is within the respective one of the scan areas A1 and A2. It will be clear that, since each output pulse of any one of these "and" gates acts to set one of the vane flip-flops, any additional output pulse in recognition of the same luminescently tagged stamp has no effect because it merely acts to set a respective vane flip-flop that is already in the set condition.

That portion of the electronic arrangement of FIG. 15 that would have been utilized to effect the cancelling of stamps was purposely omitted to simplify the description. It is obvious, however, that selective cancellation of properly located phosphorescently tagged stamps could also be effected with the arrangement of FIG. 15 merely by adding thereto the parts associated with stamp cancelling that were eliminated from the arrangement of FIG. 9. It is also obvious that if cancellation of all properly located luminescently tagged stamps were desired rather than selective cancellation of only properly located phosphorescently tagged stamps, the only modification necessary would be to connect both "and" gates 72 (through the respective dual cathode followers 85) to set the respective die flip-flops 84 rather than connecting both "and" gates 71 (through the respective dual cathode followers 85) to set the respective die flip-flops 84.

Referring to FIGS. 1 and 2, FIG. 3C and FIG. 4C, the letter-receiving station 24, in addition to having the table 23 on which the letters are placed on edge in bunches includes a power driven belt 101. The upper surface of the belt 101 is substantially flush with the table 23. The belt 101 urges the letters toward a stop plate 102 which is substantially in line with the path of travel of the letters through the machine. Projecting through the stop plate 102 is a feed belt 103 which constantly urges the end letter forwardly toward a pair of continuously rotating rollers 104 whose surfaces have a high coefficient of friction. The rollers 104, engaging the foremost letter, advance it to the separating device which includes a continuously driven frictional surfaced feed wheel 105 and a reversely driven separator wheel 106, the latter being capable of preventing the feed of a second letter until the foremost letter has passed beyond the bite of the wheel 105. The separating and advancing means operates in a known manner to advance one letter at a time along a predetermined path, the trailing edge of one letter being spaced from the leading edge of the next letter.

As the leading edge of a letter advances beyond the separator wheels 105 and 106 it enters between the contacting faces of the belts 32. As shown in FIG. 3B, FIG. 4B, and FIG. 4C, the belts travel over pulleys 107 mounted in frames 108 pivotally mounted on rods 109 carried by the deck 22. The frames 108 carrying the pulleys 107 for one belt are spring-urged toward those carrying the pulleys 107 for the other belt by springs 110, the fixed end of each of which is carried by an arm 111 rigid with the posts 109 (FIG. 3B) thereby causing the belts to be resiliently urged against each other so as to be capable of yielding to permit letters, including thick ones, to pass between the belts and cause them to be advanced.

Supplementing the spring-pressed pulleys to hold the belts together are rollers 112 and 113 and these are located along the path of the belts between the pulleys at the receiving and delivery ends of the belts. The rollers 113 are carried on arms 113*a* and are urged by springs 113*b* toward the rollers 112 which may be mounted on fixed axles. Each of the belt pulleys 107 on the discharge end is power driven through a universal joint 107*a* connected to a shaft 107*b* driven by a gear 107*c*. The gear 107*c* is power driven by any suitable mechanism.

It will be appreciated, of course, that the stamp cancelling mechanism may be of any suitable kind and that the mechanisms illustrated in FIG. 3B and FIG. 4B are shown by way of example.

The cancelling mechanisms, 51L for cancelling stamps at the leading edges of the letters and 51T for cancelling the stamps at the trailing edges of the letters, are essentially the same. Each includes a die 50 mounted on a shaft 116 and each has a flat face 117 which, in its normal position as shown in FIG. 3B, is clear of the path of the letters. When a stamp is to be cancelled, a signal from the network above described is received by the solenoid 52 (see FIGS. 10 and 11) and this causes the operation of a single revolution clutch 115. Impression rollers 114, 114 cooperate with the cancelling dies 50, 50 and each impression roller is driven by a universal joint connection 114*a* to driven gear 114*b*.

The single revolution clutch 115 comprises a sleeve 118 secured to the shaft 116, a hub end 119 of a gear 121 mounted for free rotation on the shaft 116, and a coupling coil spring 120 surrounding the peripheral surfaces 118*a* and 119*a* of the sleeve 118 and hub 119, respectively. The coils of the spring 120 are tensioned to normally wrap around and grip said sleeve and hub to cause them to rotate together. The gear 121 is power driven and provides the drive through the spring 120 to the shaft 116 and die 50 to rotate the printing face thereof against the stamp as the letter passes the printing point. The sleeve 118 has at its upper end, as viewed in FIG. 12, a flange 122 having a notch 123 in which the looped end 124 of the spring 120 is anchored. The other looped end 125 of the spring is anchored in a notch in the internal end flange 126 of a casing 127 which encloses the spring 120 and limits its expansion movement. The flange 126 is mounted on a portion 128 of the hub 119 for free rotation thereon.

To unwrap the coil spring 120 and thus disconnect the sleeve 118 from the driven hub 119, there is provided a control shaft 129 on which there is secured a clutch stop and release lever 130 which is positioned to engage a stop shoulder 131 provided on a projecting portion of the casing 127. At the moment of engagement of the lever 130 with the stop shoulder 131, the shaft 116, to which the other end of the spring is connected, is rotating and it will continue to rotate and unwind the spring 120 until the shaft is stopped by a stop shoulder 132 on the flange 122 engaging a dog 133 on the shaft 129. When the spring 120 unwinds, it ceases to grip the hub 119 and sleeve 118 and thereby allows the die shaft 116 to remain stationary while the driving gear 121 continues to operate. The unwinding movement of the spring 120 may be little or great depending on the requirements.

In the specific form of the invention illustrated herein, it has been found that the relative movement between the ends of the springs in the order of 30° is sufficient.

After the stop shoulder 132 has engaged the dog 133, the inherent tendency of the spring is to rewind by causing reverse rotation on the shaft 116. To avoid this, the shaft 116 is provided with a disk 134 which has a stop shoulder 135 facing oppositely to the stop shoulder 132. A back-check pawl 136 pivoted on a stop shaft 137 is urged by a spring 138 in engagement with the surface of the disk 134 so that immediately after the dog 133 engages the shoulder 132 the back-check pawl 136 engages the shoulder 135 and thus the shaft 116 and the die 50 are positively held against movement in either direction.

In order to start the operation of the one revolution clutch 115 and cause the cancelling die 50 to operate, the shaft 116 is provided with an arm 139 adapted to be operated by the solenoid 52. The solenoid 52 has an armature 140 which has at one end a link 141 connected to the arm 139. The link 141 has its terminal end connected to a return spring 142. When the solenoid 52 is energized, it causes the stop pawls 130 and 133 to disengage the stop shoulders and thus permits the spring 120 to wind and grip the drums 118*a* and 119*a*, with the result that the cancelling die 50 is rotated and the rotation continues until the stop shoulders 131 and 132 are engaged by the pawls 130 and 133, whereupon the shaft 116 is stopped.

To permit the use of a light return spring 142 for the armature 140 and the shaft 129, there is provided on the shaft 129 an arm 143 which is positioned to engage a cam 144 on the shaft 116 and this cam is so shaped and positioned as to operate the arm 143 and positively rotate the shaft 129 and cause the pawls 130 and 133 to be moved to the declutching position shown in FIG. 10.

To avoid an unrequired repeated operation of the cancelling die shaft 116 which might occur if the pawls 130 and 133 rebound away from the stop shoulders, the stop shoulder 132 may be provided with a slight undercut as shown in the order of 70° and the pawl will be shaped to fit the undercut so as to be trapped momentarily thereby in stop-engaging position.

The dies 50, 50 are inked by a yielding ink roller 145 whose position may be regulated by an adjusting screw 146.

As was pointed out above, the segregating mechanism includes three stackers 26, 27 and 28 and the deflecting vanes 30 and 31 which control the passage of successive letters into a predetermined one of the compartments.

As will be seen from FIG. 3A and FIG. 4A, the vanes are mounted on vertical shafts 147, each shaft having a pair of opposite arms 148 by which each vane may be moved from the position where it intersects the path, and thus the vanes control the movement of the letters into one of the three stackers. The operating arms 148 for the vane 30 are connected to the armatures of the solenoids 89L and 91L while the operating arms for the vane 31 are connected to solenoids 89R and 91R. By operation of the solenoids 89L, 89R, 91L and 91R as described above, the vanes 30 and 31 are positively moved to and from their parallel positions and letter-intersecting positions.

The three stackers 26, 27 and 28, into one of which each advancing letter is directed by the segregating mechanism, are best shown in FIG. 3A.

When a letter to be directed to the stacker 26 approaches the vanes 30 and 31, the latter are parallel to each other as shown in FIG. 12 and the letter therefore continues to travel in substantially a straight line. The letter is guided by guide plates 153 to a position between a pair of continuously rotating feed rollers 154. From the feed rollers 154 the letter is guided by guide plates 155 to another pair of continuously rotating feed rollers 156, and from the feed rollers 154 the letter passes into the stacker 26.

When a letter to be directed to the stacker 27 approaches the vanes 30, 31, the latter assume the positions shown in FIG. 14. The letter is deflected by the vane 30 and guided by an inclined guide plate 157L into the stacker 27.

When a letter to be directed to the stacker 28 approaches the vanes 30, 31, the latter assume the positions shown in FIG. 13. The letter is deflected by the vane 31 and guided by an inclined guide plate 157R into the stacker 28.

In each of the stackers 26, 27 and 28 there is a leading edge stop 158, a fixed lateral guide 159 and a yielding lateral guide or presser plate 160. Also in each stacker there is a continuously rotating impeller 161 which urges each successive letter entering the respective stacker to a position engaging the lead edge stop 158. As the letters accumulate between the lateral guides 159 and 160, the latter recedes in a well known manner so that the letters accumulate in a stack. This operation is assisted by a continuously driven belt 162 which is positioned to engage the lower edges of the letters just above the plane of the table 23. After a quantity of letters has been accumulated, the belt 162 urges the trailing edges of the letters away from a letter entering the respective stacker so as to maintain a suitable throat open between the stack and the lateral guide 159.

As shown in FIG. 3A and FIG. 4A, one of each of the pairs of rollers 154 and 156 is mounted on a spring-pressed arm 163 so as to yieldingly engage the other roller of the pair and permit letters of various thicknesses to be fed between them.

With the embodiment of FIG. 15 as particularly described above, phosphorescently tagged stamps and fluorescently tagged stamps are distinguished, each from the other, by giving the vane thyratron 88L precedence over the vane thyratron 88R. To reiterate briefly, only the "and" gate 72 of either the lead or trail stamp recognition section produces an output when a fluorescently tagged stamp is recognized, and this ultimately causes vane thyratron 88R to be ignited whereas nothing occurs to cause vane thyratron 88L to be ignited. When a phosphorescently tagged stamp is recognized, however, both of the "and" gates 71 and 72 of the respective stamp recognition section respond by producing an output. The output by the respective "and" gate 72 acts again to ignite vane thyratron 88L, and the output by the respective "and" gate 71 acts to ignite vane thyratron 88R. Because vane thyratron 88L has precedence over vane thyratron 88R, however, only the vane thyratron 88L is ignited. FIG. 16 represents a modification whereby phosphorescently and fluorescently tagged stamps are distinguished between in a different manner.

Referring to FIG. 16, a stamp recognition section is depicted which can be substituted for any one of the lead and trail stamp recognition sections of either one of the embodiments of FIGS. 9 and 15. According to the modification of FIG. 16, each one of the lead and trail stamp recognition sections of both of these embodiments is modified only in that the components from the "and" gate 60 and from the squaring circuit 69 to the dual cathode follower 85 are changed. As pointed out above in connection with the embodiments of FIGS. 9 and 15, the squaring circuit 69 produces an output pulse and the "and" gate 60 does not produce an output pulse when a fluoroescently tagged stamp is recognized. Referring to FIG. 16, the output pulse by squaring circuit 69 triggers a one-shot multivibrator 165 which responds by producing an output pulse of very short duration. An inhibitor circuit 166 is provided which includes a conventional differentiating network and which produces a peak pulse in response to the trail edge of the output of the one-shot multivibrator 165 except at such times as an inhibiting signal is being produced by a one-shot multivibrator 167. One-shot multivibrator 167 produces no output signal when a fluorescently tagged stamp is fed past the scanner, however, so that recognition of a fluorescently tagged stamp results in a corresponding output pulse by the inhibitor circuit 166, and this latter output pulse is transmitted to the "and" gate 72. The "and" gate 72 responds, as described previously, by producing an output pulse which is transmitted by the dual cathode follower 85 to be utilized as desired. When, as pointed out above in connection with the embodiments of FIGS. 9 and 15, a phosphorescently tagged stamp is fed past the scanner, however, the "and" gate 60 produces an output pulse and the squaring circuit 69 may or may not produce an output pulse. The output pulse by the "and" gate 60 causes the "and" gate 71 to produce an output pulse which is transmitted by the dual cathode follower 85 for utilization as desired, and the output pulse of the "and" gate 60 also triggers the one-shot multivibrator 167. The one-shot multivibrator 167 responds by producing an output pulse of comparatively long duration which, so long as it endures, prevents the inhibitor circuit 166 from producing an output in response to an output pulse from the one-shot multivibrator 165. The duration of the output pulse of the one-shot multivibrator 167 is equal to or slightly longer than the length of time for the respective scan area A1 or A2 to pass by the respective scanner 35L or 35R. It is clear, then, that if squaring circuit 69 does produce an output pulse in recognition of a phosphorescently tagged stamp, this output pulse is blanked out by the inhibitor circuit 166. Of course, if squaring circuit 69 does not produce an output pulse in recognition of a phosphorescently tagged stamp, the inhibitor circuit 166 will not produce an output. Accordingly, when a phosphorescently tagged stamp is recognized, this will be manifested by only the "and" gate 71 producing an output pulse which is transmitted by the cathode follower 85.

It will be recalled that "and" gate 60 can produce an output only while the ultraviolet lamps are de-energized and that squaring circuit 69 can produce an output only when the ultraviolet lamps 41, 41 are energized. Therefore, it could happen that squaring circuit 69 produces an output pulse in recognition of a phosphorescently tagged stamp before "and" gate 60 produces an output pulse which prevents the inhibitor circuit 166 from responding to any subsequent output pulse of the squaring circuit. This would result in a false recognition of a phosphorescently tagged stamp as a fluorescently tagged stamp by the appearance of a pulse at the output of "and" gate 72. The one-shot multivibrator 165 acts as a delay means to prevent such a false recognition in that the duration of the output pulse of this one-shot multivibrator is slightly longer than each of the spaced time intervals during which the lamps 41, 41 are energized. Of course, when a fluorescently tagged stamp is recognized, no inhibiting pulse is produced by the one-shot multivibrator 167.

It is clear, then, that with the modification of FIG. 16, two recognition channels are provided. One of these recognition channels extends from the photomultipler 36 through the "and" gate 60 and produces a distinctive output in recognition only of a phosphorescently tagged stamp. The other recognition channel extends from the photomultiplier 36 through the inhibitor circuit 166 and produces a distinctive output in recognition only of a fluorescently tagged stamp. With the addition of the "and" gates 71 and 72 to these two recognition channels, each of these channels is limited to producing a distinctive output only in recognition of a respective phosphorescently or fluorescently tagged stamp which is properly located at the lower leading or lower trailing position on a letter. The outputs of these two recognition channels can be transmitted by the dual cathode follower 85 for utilization as described above in connection with the embodiments of FIGS. 9 and 15 to face or sort the letters and/or to cancel the stamps.

Demonstrating the versatility and further utility of the present invention is the modification depicted in FIG. 18. With this modification, each one of the recognition channels according to each one of the embodiments of FIGS. 9 and 15 as well as each one of the recognition channels according to the modification of FIG. 16 is adapted to provide two recognition channels which distinguish between a stamp tagged with a single bar of luminescent material (see FIG. 17A) and a stamp tagged with two bars of luminescent material (see FIG. 17b). It will be recalled that each one of the "and" gates 71 and 72 according to the embodiments of FIGS. 9 and 15 and according to the modification of FIG. 16, produces an output pulse in recognition of a phosphorescently tagged stamp or a fluorescently tagged stamp or both. The "and" gate 170 is representative of all of these "and" gates 71 and 72 in that output of any one of the latter "and" gates can be connected as the representative "and" gate 170 is connected in FIG. 18.

When a letter L carrying a stamp S tagged with a single vertical bar 171 of luminescent material (as depicted in FIG. 17A) is fed past the respective scanner 35L or 35T, the "and" gate 170 produces an output pulse which is shaped by a squaring circuit 172 and transmitted to a dual cathode follower 173, to a one-shot multivibrator 174 and to an "and" gate 175. The output pulse of squaring circuit 172 is transmitted by the dual cathode follower 173 as a recognition of a single luminescent bar 171. The output pulse of squaring circuit 172 also triggers the one-shot multivibrator 174. The duration of the output pulse of the one-shot multivibrator 174 is just slightly greater than the scan duration of a single bar 171. The trail edge of this output pulse of one-shot multivibrator 174 triggers a one-shot multivibrator 177 which responds by producing an output pulse whose duration equals or slightly exceeds the scan duration of the space between the two bars 171, 171 as shown in FIG. 17A. This output pulse of the one-shot multivibrator 177 is transmitted to the "and" gate 175, but, due to the delay provided by the one-shot multivibrator 174, arrives after the shaped output pulse of the squaring circuit 172 caused by the first bar. Since "and" gate 175 produces an output only when it receives two simultaneous input pulses, no output is produced by the "and" gate 175. Consequently, when the stamp S with only a single luminescent bar as shown in FIG. 17A is fed past the respective scanner 35L or 35T, the only significant output pulse transmitted by dual cathode follower 175 is the first one that is produced by squaring circuit 172. Of course, the squaring circuit will ordinarily produce a plurality of output pulses in recognition of the single bar 171, but as previously noted, only the first output pulse of a series is effective.

When a letter L carrying a stamp S tagged with two vertical bars 171, 171 of luminescent material (as depicted in FIG. 17B) is fed past the respective scanner 35L or 35T, operation of the arrangement of FIG. 18 is the same for the first one of these two bars as it is for the single bar of FIG. 17A. The shaped output pulse of squaring circuit 172 in recognition of the second one of the two bars 171, 171 is transmitted by the dual cathode follower 173, but this has no effect because, as previously noted, only the first one of a series of pulses is effective. This second shaped output pulse by the squaring circuit is received by the "and" gate 175 within the duration of the output pulse by the one-shot multivibrator 177 (the latter output pulse having been effected by recognition of the first bar 171) whereupon the "and" gate 175 produces an output pulse signifying recognition of the second bar 171.

Accordingly, recognition of a stamp tagged with a single bar 171 of luminescent material is manifested by an output pulse by the squaring circuit 172 which is transmitted by the dual cathode follower 173 for utilization as desired. Recognition of stamp with two bars 171, 171 or luminescent material is manifested by an output pulse by both the squaring circuit 172 and by the "and" gate 175 which are transmitted by the dual cathode follower 176 for utilization as desired. By way of example, the outputs of the dual cathode follower 173 could be connected in the manner identical to that of the dual cathode follower 85 of the lead stamp recognition section of the embodiment of FIG. 9. In this case, only those stamps at the lower lead position and tagged with two luminescent bars 171, 171 will be cancelled. All of the letters carrying a stamp at the lower lead position and tagged with either one bar or two bars will be directed by the vanes 30, 31 to the stacker 28. If the outputs of the dual cathode follower 173 were connected in the manner identical to that of the dual cathode follower 85 of the lead stamp section of the embodiment of FIG. 15, all letters carrying a stamp at the lower lead position and tagged with a single luminescent bar would be directed by the vanes 30, 31 to the stacker 28 and all letters carrying a stamp at the lower lead position and tagged with two luminescent bars would be directed by the vanes 30, 31 to the stacker 27.

It has been pointed out above in connection with both of FIGS. 9 and 15 that all of the letters disposed in the stacker 26 after the first pass of all of the letters through the apparatus, may be manually inverted and run through the apparatus a second time to accommodate those letters having a properly located luminescently tagged stamp adjacent their upper edges during the first pass through the apparatus. Alternatively, the device as disclosed in U.S. Patent No. 2,947,406 could be provided with the electronic arrangement of either one of the embodiments of FIGS. 9 and 15 as disclosed herein or as modified by either one or both of the modifications disclosed herein. With the device of said patent, two similar apparatuses are disposed in tandem with an automatic letter inverter therebetween. Instead of those letters carrying no properly located luminescently tagged stamp being stacked in a third stacker (such as the stacker 26 disclosed herein) during the initial pass of all of the letters of the original batch, this third stacker of the first apparatus is eliminated. Each successive letter carrying no properly located luminescently tagged stamp adjacent its lower edge when fed through the first respective apparatus is automatically inverted and fed through the second apparatus whereby each of the letters of the original batch having a properly located luminescently tagged stamp will be disposed in the proper one of four different stackers and all of the letters of the original batch not carrying a properly located luminescently tagged stamp will be disposed in the reject stacker of the second apparatus.

All of the individual electronic components shown in FIGS. 9, 15, 16 and 18 will be recognized as being conventional by those with only ordinary skill in the art. The respective squaring circuits are otherwise known as Schmidt circuits (see the bottom of page 164 and the top of page 168 of the book Pulse and Digital Circuits by Millman and Taub, published 1956 by McGraw-Hill). The respective flip-flops are otherwise known as bistable multivibrators (see page 140 of said book). The respective "or" gates, "and" gates and inhibitor circuits are as indicated in sections 13—2, 13—3 and 13—5, respectively of said book. The reespective one-shot multivibrators are also known as monostable multivibrators (see page 174 of said book).

Since many changes can be made in the embodiments and modifications of the invention particularly described and shown herein without departing from the scope of the invention, it is intended that these embodiments and modifications be considered as exemplary and that the invention not be limited except as warranted by the following claims.

What is claimed is:

1. An apparatus for recognizing articles bearing phosphorescent markings; said apparatus comprising: scanning means; means for feeding said articles in one-by-one succession past said scanning means; excitation means, effective when energized, for exciting the phosphorescent markings; means operatively associated with said excitation means for alternately energizing and de-energizing the excitation means while each of said phosphorescent markings is adjacent said scanning means; and a recognition channel operatively associated with said scanning means for producing a distinctive output in response to the after-glow emission of light from each one of said phosphorescent markings to said scanning means while said excitation source is de-energized after being energized.

2. An apparatus for operating upon a plurality of articles each of which bears a phosphorescent marking, a fluorescent marking or neither a phosphorescent nor a fluorescent marking, said apparatus comprising: scanning means, means for feeding said articles in one-by-one succession to move a respective marking carried thereby past said scanning means, excitation means operatively arranged to excite each of said markings at spaced intervals while the respective marking moves past said scanning means, a recognition channel operatively associated with said scanning means for producing a distinctive output in response to the emission of light from each one of the phosphorescent and fluorescent markings while the respective marking moves past said scanning means and during said spaced intervals, and guiding means for directing each article fed past said scanning means to a first location when one of said distinctive outputs is produced due to a phosphorescent or fluorescent marking thereon and to a second location when one of said distinctive outputs is not produced due to the absence of a phosphorescent or fluorescent marking thereon.

3. An apparatus for recognizing articles bearing phosphorescent markings and articles bearing fluorescent markings and for distinguishing therefrom the articles bearing phosphorescent markings; said apparatus comprising: scanning means; means for feeding said articles in one-by-one succession past said scanning means; excitation means, effective when energized, for exciting both the phosphorescent and the fluorescent markings; means operatively associated with said excitation means for alternately energizing and de-energizing the excitation means while each of said phosphorescent and fluorescent markings is adjacent said scanning means; a first recognition channel operatively associated with said scanning means for producing a distinctive output in response to the emission of light from each one of said phosphorescent and fluorescent markings to said scanning means while said excitation source is energized; and a second recognition channel operatively associated with said scanning means for producing a distinctive output in response only to the after-glow emission of light from each one of said phosphorescent markings to said scanning means while said excitation source is de-energized after being energized.

4. An apparatus for recognizing articles bearing phosphorescent markings, for recognizing articles bearing fluorescent markings, and for distinguishing therebetween; said apparatus comprising: scanning means; means for feeding said articles in one-by-one succession past said scanning means; excitation means, effective when energized, for exciting both the phosphorescent and the fluorescent markings; means operatively associated with said excitation means for alternately energizing and de-energizing the excitation means while each of said phosphorescent and fluorescent markings is adjacent said scanning means; a first recognition channel operatively associated with said scanning means for producing a distinctive output in response only to the emission of light from each one of said fluorescent markings to said scanning means while said excitation source is energized; and a second recognition channel operatively associated with said scanning means for producing a distinctive output in response only to the after-glow emission of light from each one of said phosphorescent markings to said scanning means while said excitation source is de-energized after being energized.

5. An apparatus for recognizing articles bearing phosphorescent markings, for recognizing articles bearing fluorescent markings, and for distinguishing therebetween, said apparatus comprising: a scanner, means for feeding said articles in one-by-one succession to move the respective markings carried thereby past said scanner, excitation means operatively arranged to excite each respective one of said markings at spaced intervals while moving past said scanner, a first recognition channel operatively associated with said scanner for producing a distinctive output in response to the emission of light from each one of only the fluorescent markings during said spaced intervals while the respective marking moves past said scanner, and a second recognition channel operatively associated with said scanner for producing a distinctive output in response to the after-glow emission of light from each one of only the phosphorescent markings during the intervals between said spaced intervals while the respective phosphorescent marking moves past said scanner.

6. An apparatus for recognizing articles bearing phosphorescent markings and articles bearing fluorescent markings, said apparatus comprising: a scanner, means for feeding said articles in one-by-one succession to move the respective markings carried thereby past said scanner, excitation means operatively arranged to excite each respective one of said markings at spaced intervals while moving past said scanner, a first recognition channel operatively associated with said scanner for producing a distinctive output in response to the emission of light from each one of the phosphorescent and fluorescent markings during said spaced intervals while the respective marking moves past said scanner, and a second recognition channel operatively associated with said scanner for producing a distinctive output in response to the after-glow emission of light from each one of only the phosphorescent markings during the intervals between said spaced intervals while the respective phosphorescent marking moves past said scanner.

7. An apparatus for recognizing articles bearing phosphorescent markings, for recognizing articles bearing fluorescent markings, and for distinguishing therebetween; said apparatus comprising: a scanner; means for feeding said articles in one-by-one succession to move the respective markings carried thereby past said scanner; excitation means operatively arranged to excite each respective one of said markings at spaced intervals while moving past said scanner; a first recognition channel including first means operatively associated with said scanner for producing a distinctive output in response to the emission of light from the phosphorescent and fluorescent markings during said spaced intervals while the respective marking moves past said scanner; and a second recognition channel including means operatively associated with said scanner for producing a distinctive output in response to the after-glow emission of light from only the phosphorescent markings during the intervals between said spaced intervals while the respective phosphorescent marking moves past said scanner; said first recognition channel further including second means operable in response to each distinctive output by said second recognition channel in recognition of a phosphorescently tagged stamp for preventing said first means of said first recognition channel from producing a distinctive output in recognition of the same stamp whereby said first recognition channel is limited to producing a distinctive output in recognition of only fluorescently tagged stamps.

8. An apparatus for selectively cancelling stamps tagged with a phosphorescent material and carried by pieces of letter mail intermixed with pieces of letter mail not carrying stamps so tagged with phosphorescent material, said apparatus comprising: scanning means, means for feeding the intermixed pieces of letter mail in one-by-one succession past said scanning means, excitation means, effective when energized, for exciting said phosphorescently tagged stamps, means operatively associated with said excitation means for energizing and then de-energizing the excitation means while each of said phosphorescently tagged stamps is moving past said scanning means, a recognition channel operatively associated with said scanning means for producing a distinctive output in response only to the after-glow emission of light from each one of the phosphorescently tagged stamps to said scanning means while said excitation source is de-energized after being energized, and means operatively arranged to cancel only said phosphorescently tagged stamps in response to said distinctive outputs.

9. An apparatus for operating upon a plurality of pieces of letter mail wherein certain of said pieces carry stamps tagged with phosphorescent material and wherein certain of said pieces carry stamps tagged with fluorescent material, said apparatus comprising: scanning means; means for feeding said pieces of letter mail in one-by-one succession past said scanning means, excitation means operatively arranged to excite each of said tagged stamps at spaced intervals while moving past said scanning means, a first recognition channel operatively associated with said scanning means for producing a first distinctive output in response to the emission of light from a phosphorescently tagged stamp carried by any one of said pieces of letter mail, a second recognition channel operatively associated with said scanning means for producing a second distinctive output in response to the afterglow emission of light from only a phosphorescently tagged stamp carried by any one of said pieces of letter mail, means operatively arranged for directing each piece of letter mail carrying a phosphorescently or fluorescently tagged stamp to a predetermined location in response to a respective one of said first distinctive outputs, and means operatively arranged to cancel only said phosphorescently tagged stamps in response to said second distinctive outputs.

10. An apparatus for operating upon a plurality of pieces of letter mail wherein certain of said pieces carry stamps tagged with phosphorescent material and wherein certain of said pieces carry stamps with fluorescent material, said apparatus comprising: scanning means; means for feeding said pieces of letter mail in one-by-one succession past said scanning means, excitation means operatively arranged to excite each of said tagged stamps at spaced intervals while moving past said scanning means, a first recognition channel operatively associated with said scanning means for producing a first distinctive output in response only to the emission of light from a fluorescently tagged stamp carried by any one of said pieces of letter mail, a second recognition channel operatively associated with said scanning means for producing a second distinctive output in response to the afterglow emission of light from only a phosphorescently tagged stamp carried by any one of said pieces of letter mail, and guide means operatively arranged for directing each piece of letter mail carrying a fluorescently tagged stamp to a first location in response to a respective one of said first distinctive outputs and for directing each piece of letter mail carrying a phosphorescently tagged stamp to a second location in response to a respective one of said second distinctive outputs, and means operatively arranged to cancel each of only said phosphorescently tagged stamps in a response to a respective one of said second distinctive outputs.

11. An apparatus for operating upon pieces of letter mail each of which bears a stamp tagged with phosphorescent material, a stamp tagged with fluorescent material or no stamp tagged with either a phosphorescent or a fluorescent material; said apparatus comprising: scanning means; means for feeding said articles in one-by-one succession past said scanning means; excitation means, effective when energized, for exciting both the phosphorescently and the fluorescently tagged stamps; means operatively associated with said excitation means for energizing and then de-energizing the excitation means while each of said phosphorescently or fluorescently tagged stamps is adjacent said scanning means; first recognition means operatively associated with said scanning means for producing a first distinctive output in response only to the emission of light from said phosphorescently or fluorescently tagged stamps to said scanning means while said excitation source is energized; second recognition means operatively associated with said scanning means for producing a second distinctive output in response only to the after-glow emission of light from said phosphorescently tagged stamps to said scanning means while said excitation source is de-energized after being energized; stamp cancelling means located to cancel only said phosphorescently tagged stamps when said distinctive outputs are produced; and guide means for directing each respective one of said pieces of letter mail to a first location when one of said first distinctive outputs is produced and for directing each respective one of said pieces of letter mail to a second location when one of said first distinctive outputs is not produced.

12. An apparatus for operating upon pieces of letter mail each of which bears a stamp with phosphorescent material, a stamp tagged with fluorescent material or no stamp tagged with either a phosphorescent or fluorescent material, said apparatus comprising: scanning means; means for feeding said articles in one-by-one succession past said scanning means; excitation means, effective when energized, for exciting both the phosphorescently and the fluorescently tagged stamps; means operatively associated with said excitation means for energizing and then de-energizing the excitation means while each of said phosphorescently or fluorescently tagged stamps is adjacent said scanning means; first recognition means operatively associated with said scanning means for producing a first distinctive output in response only to the emission of light from said fluorescently tagged stamps to said scanning means while said excitation source is energized; second recognition means operatively associated with said scanning means for producing a second distinctive output in response only to the after-glow emission of light from said phosphorescently tagged stamps to said scanning means while said excitation source is de-energized after being energized; and guide means for directing each of said pieces of letter mail carrying a fluorescently tagged stamp to a first location in response to a respective one of said first distinctive outputs, for directing each of said pieces of letter mail carrying a phosphorescently tagged stamp to a second location in response to a respective one of said second distinctive outputs and for directing each of said pieces of letter mail carrying no fluorescently or phosphorescently tagged stamp to a third location in response to the absence of a respective one of said first or second distinctive outputs.

No references cited.

Disclaimer 3,027,830.—*Vincent M. Yaeger*, Stamford, Conn. RECOGNITION APPARATUS. Patent dated Apr. 3, 1962. Disclaimer filed Oct. 21, 1963, by the assignee, *Pitney-Bowes, Inc.*

Hereby enters this disclaimer to claims 1, 3 and 8 of said patent.

[*Official Gazette January 7, 1964.*]